(12) United States Patent
Kang et al.

(10) Patent No.: US 9,584,211 B2
(45) Date of Patent: Feb. 28, 2017

(54) METHOD AND APPARATUS FOR TRANSMITTING UPLINK SIGNAL IN WIRELESS COMMUNICATION SYSTEM

(71) Applicant: LG ELECTRONICS INC., Seoul (KR)

(72) Inventors: Jiwon Kang, Anyang-si (KR); Dongcheol Kim, Anyang-si (KR); Jiwoong Jang, Anyang-si (KR); Hangyu Cho, Anyang-si (KR); Sungho Park, Anyang-si (KR); Dongguk Lim, Anyang-si (KR)

(73) Assignee: LG Electronics Inc., Seoul (KR)

(*) Notice: Subject to any disclaimer, the term of this patent is extended or adjusted under 35 U.S.C. 154(b) by 88 days.

(21) Appl. No.: 14/406,023

(22) PCT Filed: Jun. 5, 2013

(86) PCT No.: PCT/KR2013/004966
§ 371 (c)(1),
(2) Date: Dec. 5, 2014

(87) PCT Pub. No.: WO2013/183939
PCT Pub. Date: Dec. 12, 2013

(65) Prior Publication Data
US 2015/0200722 A1  Jul. 16, 2015

Related U.S. Application Data

(60) Provisional application No. 61/656,994, filed on Jun. 7, 2012.

(51) Int. Cl.
*H04B 7/14* (2006.01)
*H04B 7/15* (2006.01)
(Continued)

(52) U.S. Cl.
CPC ............ *H04B 7/15* (2013.01); *H04B 7/0413* (2013.01); *H04B 7/1555* (2013.01)

(58) Field of Classification Search
None
See application file for complete search history.

(56) References Cited

U.S. PATENT DOCUMENTS 5,924,022 A * 7/1999 Beasley ................ H04B 7/082
370/315
7,139,527 B2  11/2006 Tamaki et al.
(Continued)

FOREIGN PATENT DOCUMENTS

KR  10-2010-0070760 A  8/2010
KR  10-2012-0047337 A  5/2012

*Primary Examiner* — Kwang B Yao
*Assistant Examiner* — Juvena Loo
(74) *Attorney, Agent, or Firm* — Birch, Stewart, Kolasch & Birch, LLP

(57) ABSTRACT

A method and apparatus for transmitting an uplink signal in a wireless communication system are disclosed. A transmission apparatus for receiving an uplink (UL) signal from a user equipment (UE) and transmitting the received UL signal to a base station (BS) in a wireless communication system includes: a plurality of reception antennas configured to receive UL signals from the UE; a radio frequency (RF) repeater configured to amplify and map the received UL signals to at least one transmission antenna; and a plurality of transmission antennas configured to transmit the amplified UL signals to the BS, wherein the RF repeater is configured to select M received UL signals from among a plurality of received UL signals which are received in the plurality of reception antennas, and map the M received UL signals to N transmission antennas from among the plurality of transmission antennas, and the number of the reception antennas ($N_{rx,REP}$) is higher than the number of the transmission antennas ($N_{tx,REP}$), and N is the number of the (Continued)

transmission antennas which is used to transmit the M received UL signals.

12 Claims, 18 Drawing Sheets

(51) Int. Cl.
  *H04B 7/04* (2006.01)
  *H04B 7/155* (2006.01)

(56) References Cited

U.S. PATENT DOCUMENTS

| | | | |
|---|---|---|---|
| 2006/0105709 A1 | 5/2006 | Oh et al. | |
| 2010/0157876 A1* | 6/2010 | Song | H04B 7/2606 370/315 |
| 2010/0291865 A1 | 11/2010 | Gore et al. | |
| 2011/0045766 A1* | 2/2011 | Cho | H04B 7/026 455/9 |
| 2012/0027054 A1* | 2/2012 | Palanki | H04B 7/0671 375/211 |

* cited by examiner

FIG. 5
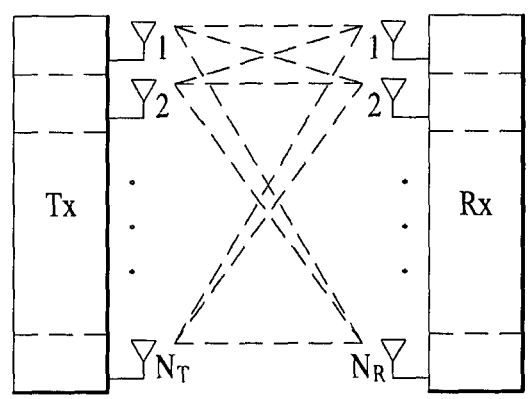
(a)
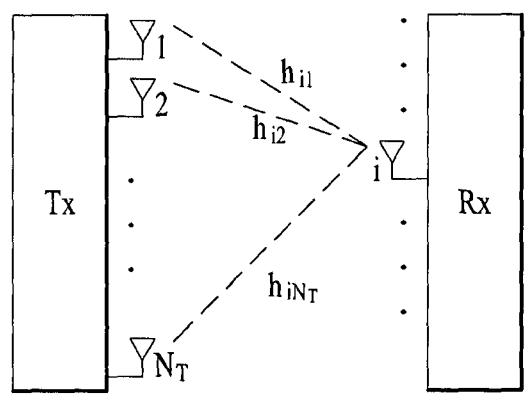
(b)

FIG. 9
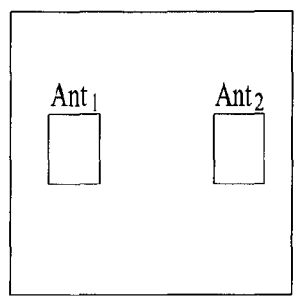
(a)
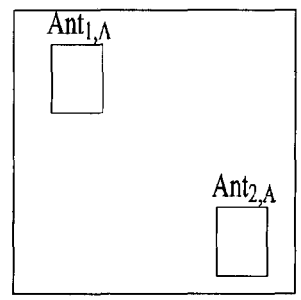
(b)
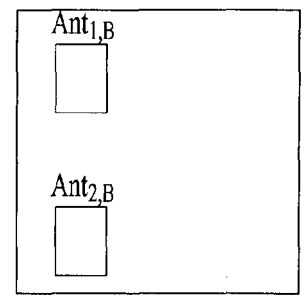
(c)

Effect of diagonalized channel

R= 0.5

FIG. 14
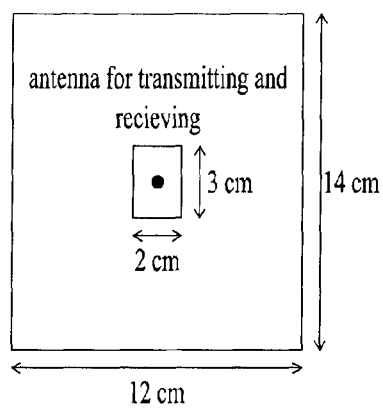
(a)
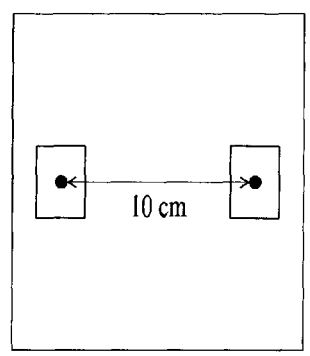
(b)
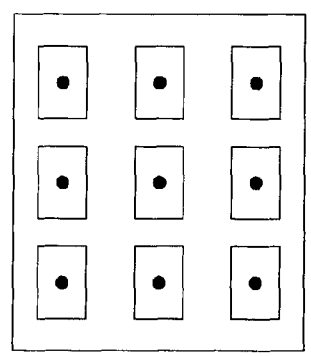
(c)
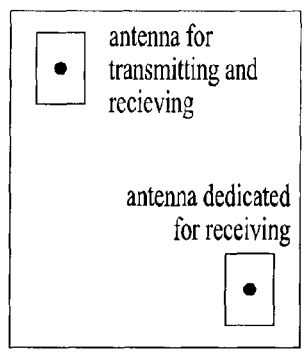
(d)
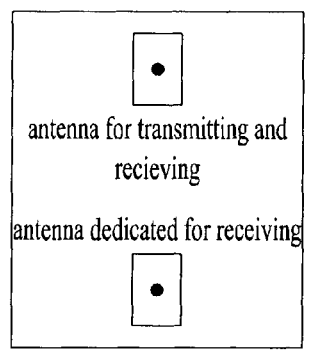
(e)
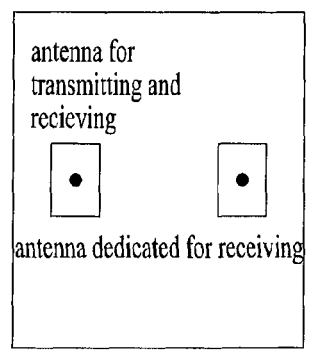
(f)

FIG. 19
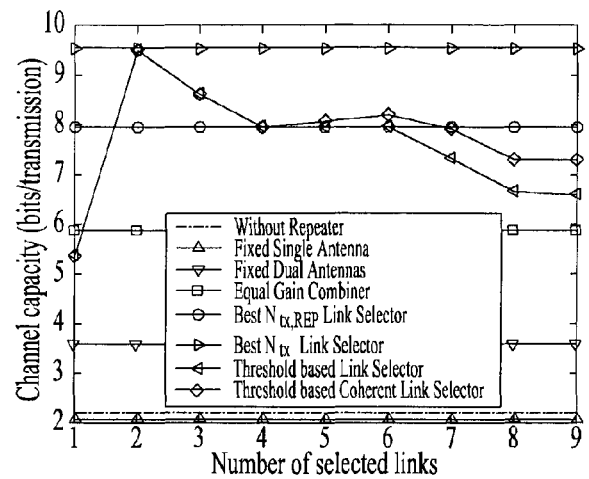
(a)
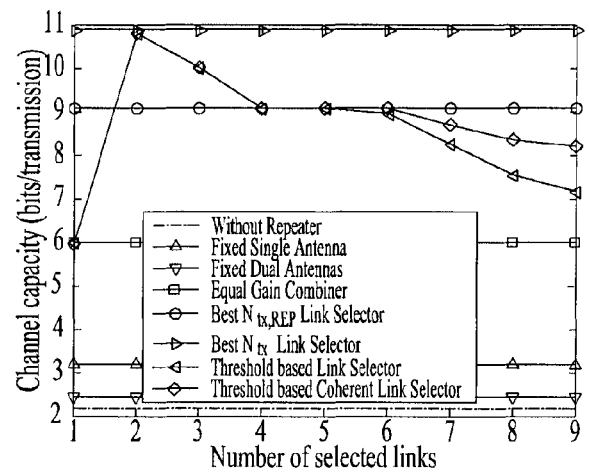
(b)
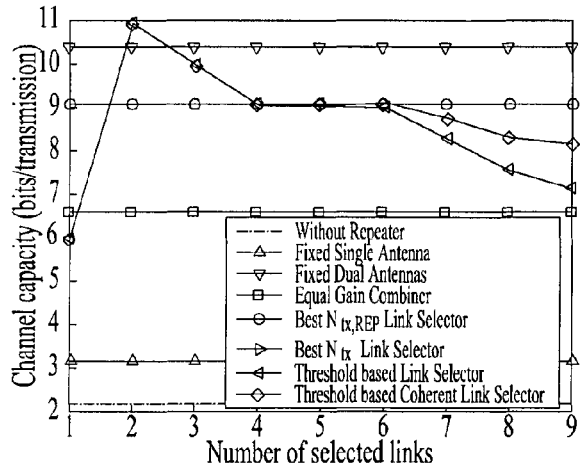
(c)

FIG. 20
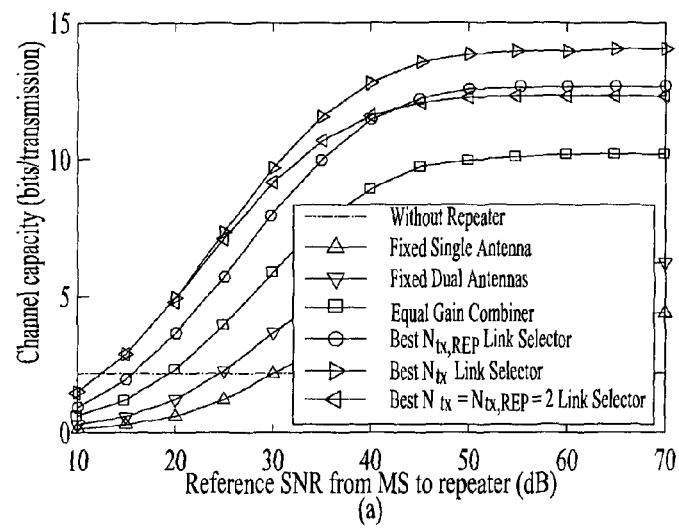
(a)
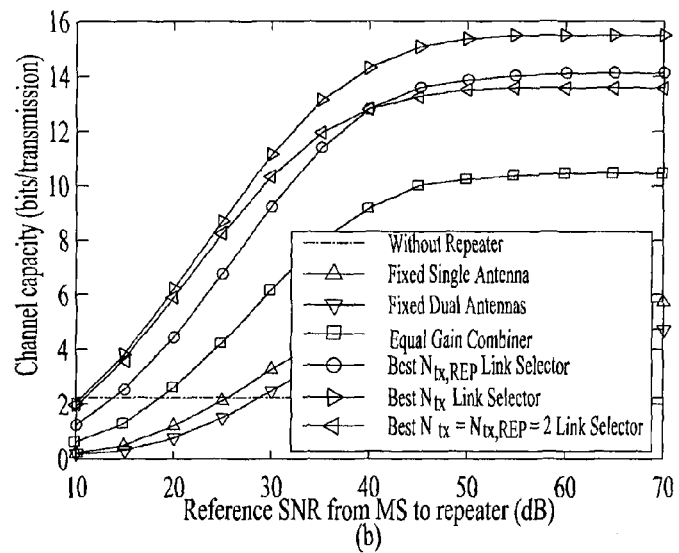
(b)
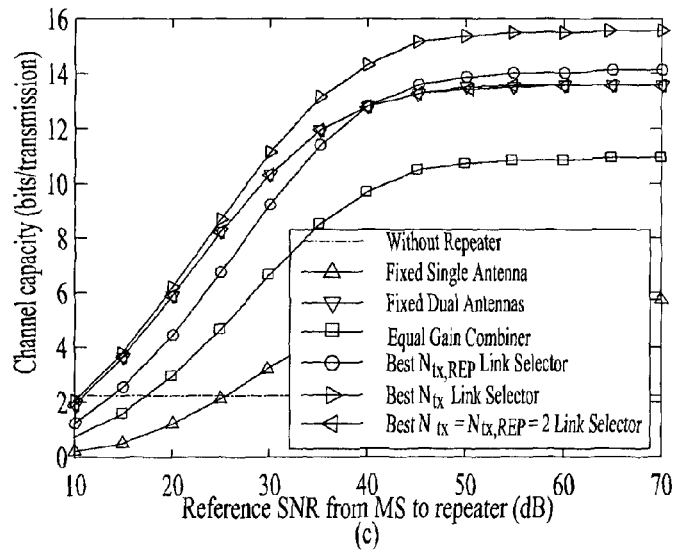
(c)

METHOD AND APPARATUS FOR TRANSMITTING UPLINK SIGNAL IN WIRELESS COMMUNICATION SYSTEM

CROSS REFERENCE TO RELATED APPLICATIONS

This application is the National Phase of PCT International Application No. PCT/KR2013/004966, filed on Jun. 5, 2013, which claims priority under 35 U.S.C. 119(e) to U.S. Provisional Application No. 61/656,994, filed on Jun. 7, 2012, all of which are hereby expressly incorporated by reference into the present application.

TECHNICAL FIELD

The present invention relates to a method and apparatus for transmitting an uplink (UL) signal in a wireless communication system, and more particularly to a method and apparatus for implementing uplink Multiple Input Multiple Output (UL MIMO).

BACKGROUND ART

Multiple Input Multiple Output (MIMO) transmission technology uses a plurality of antennas in each of a transmitter and a receiver, such that it raises capacity or SINR (Signal to Interference plus Noise Ratio) in proportion to the number of used antennas. Technology for enabling multiple antennas to be used only in the transmitter is referred to as Multiple Input Single Output (MISO), and technology for enabling a single antenna to be used in a transceiver is referred to as Single Input Single Output (SISO).

Generally, MIMO technology is a generic term of MIMO, SIMO, MIMO, and SIMO technologies.

DISCLOSURE

Technical Problem

Accordingly, the present invention is directed to a method for optimizing MIMO performance in a wireless communication system that substantially obviates one or more problems due to limitations and disadvantages of the related art.

An object of the present invention is to provide various methods for optimizing UL MIMO performance of a contiguous channel in a wireless communication system.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a transmission apparatus for receiving an uplink (UL) signal from a user equipment (UE) and transmitting the received UL signal to a base station (BS) in a wireless communication system, the transmission apparatus including: a plurality of reception antennas configured to receive UL signals from the UE; a radio frequency (RF) repeater configured to amplify and map the received UL signals to at least one transmission antenna; and a plurality of transmission antennas configured to transmit the amplified UL signals to the BS, wherein the RF repeater is configured to select M received UL signals from among a plurality of received UL signals which are received in the plurality of reception antennas, and map the M received UL signals to N transmission antennas from among the plurality of transmission antennas, and the number of the reception antennas (Nrx,REP) is higher than the number of the transmission antennas (Ntx,REP), and N is the number of the transmission antennas which is used to transmit the M received UL signals.

Preferably, if M is higher than N, the RF repeater may be configured to combine at least two received UL signals of the M received UL signals with each other and map the M received UL signals to the N transmission antennas, and if M is less than N, the RF, repeater may be configured to distribute at least one received UL signal of the M received UL signals and map the M received UL signals to the N transmission antennas, wherein the M received UL signals are combined or distributed on the basis of quality of the M received UL signals or information on transmission antennas of the UE from which the M received UL signals are transmitted.

Preferably, the M may be decided to be any one of the number of transmission antennas of the UE (Ntx), the number of the reception antennas of the transmission apparatus (Nrx,REP), the number of the transmission antennas of the transmission apparatus (Ntx,REP), and the number of received UL signals of which quality is equal or higher than a specific threshold from among the plurality of received UL signals (Nth).

Preferably, the N may be decided to be any one of the number of the transmission antennas of the UE (Ntx), the number of the transmission antennas of the transmission apparatus (Ntx,REP), and the number of received UL signals of which quality is equal or higher than a specific threshold from among the plurality of received UL signals (Nth).

Preferably, the RF repeater may be configured to combine the at least two received UL signals that are received from two different recepti antennas of the transmission apparatus after having been transmitted from a first transmission antenna from among the transmission antennas of the UE.

Preferably, the RF repeater may be configured to adjust a phase or a gain of a first received UL signal or a second received UL signal from among the at least two received UL signals so as to compensate for a difference between a first channel state and a second channel state, wherein the first channel state is formed between the first transmission antenna of the UE and a first reception antenna of the two different reception antennas receiving the first received UL signal and the second channel state is formed between the first transmission antenna of the UE and a second reception antenna of the two different reception antennas receiving the second received UL signal.

Preferably, the RF repeater may distribute K received UL signal(s) having the highest received signal quality from among from among the M received UL signals and K is an integer equal to or higher than 1.

Preferably, the N is less than the number of the transmission antennas (Ntx,REP).

In accordance with another aspect of the present invention, a method for transmitting an uplink (UL) signal using a transmission apparatus configured to receive an uplink (UL) signal from a user equipment (UE) and transmit the received UL signal to a base station (BS) in a wireless communication system includes receiving UL signals from the UE through a plurality of reception antennas, amplifying and mapping the received UL signals to at least one transmission antenna, wherein the mapping comprises: selecting M received UL signals from among a plurality of received UL signals which are received in the plurality of reception antennas, and mapping the M received UL signals to N transmission antennas from among the plurality of transmission antennas, wherein the number of the reception antennas (Nrx,REP) is higher than the number of the transmission antennas (Ntx,REP), and N is the number of the transmission antennas which is used to transmit the M received UL signals.

Preferably, the method further includes: if M is higher than N, combining at least two received UL signals of the M received UL signals with each other, and mapping the M received UL signals to the N transmission antennas; and if M is less than N, distributing at least one received UL signal of the M received UL signals, and mapping the M received UL signals to the N transmission antennas, wherein the M received UL signals are combined or distributed on the basis of quality of the received UL signals or information on transmission antennas of the UE from which the M received UL signals are transmitted.

Preferably, the M may be decided to be any one of the number of transmission antennas of the UE (Ntx), the number of the reception antennas of the transmission apparatus (Nrx,REP), the number of the transmission antennas of the transmission apparatus (Ntx,REP), and the number of received UL signals of which quality is equal or higher than a specific threshold from among the plurality of received UL signals (Nth).

Preferably, the N may be decided to be any one of the number of the transmission antennas of the UE (Ntx), the number of the transmission antennas of the transmission apparatus (Ntx,REP) and the number of received UL signals of which quality is equal or higher than a specific threshold from among the plurality of received UL signals (Nth).

Preferably, the combining may include: combining the at least two received UL signals that are received from two different reception antennas of the transmission apparatus after having been transmitted from a first transmission antenna from among the transmission antennas of the UE.

Preferably, the method may further include: adjusting a phase or a gain of a first received UL signal or a second received UL signal from among the at least two received UL signals so as to compensate for a difference between a first channel state and a second channel state, wherein the first channel state is formed between the first transmission antenna of the UE and a first reception antenna of the two different reception antennas receiving the first received UL signal and the second channel state is formed between the first transmission antenna of the UE and a second reception antenna of the two different reception antenna receiving the second received UL signal.

Preferably, the method may further include: distributing K received UL signal(s) having the highest received signal quality from among the M received UL signals and K is an integer equal to or higher than 1.

Preferably, the N may be less than the number of the transmission antennas (Ntx,REP).

It is to be understood that both the foregoing general description and the following detailed description of the present invention are exemplary and explanatory and are intended to provide further explanation of the invention as claimed.

Advantageous Effects

As is apparent from the above description, exemplary embodiments of the present invention can optimize UL signal transmission.

In addition, embodiments of the present invention can obtain an UL space-diversity gain.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIG. 5 is a diagram illustrating a wireless communication system including multiple antennas.

FIG. 9 is a block diagram illustrating a wireless device and a radio frequency (RF) amplifier according to one embodiment of the present invention.

FIG. 14 shows an exemplary model of the RF repeater and the first wireless device (UE) for experimenting the effect of embodiments of the present invention.

FIG. 19 shows channel capacity based on the number of selected links (signals) in case of the link selection shown in FIG. 18.

FIG. 20 shows the channel capacity in response to the increasing number (Ntx,REP) of Tx antennas of the RF repeater.

BEST MODE

Figure 1:
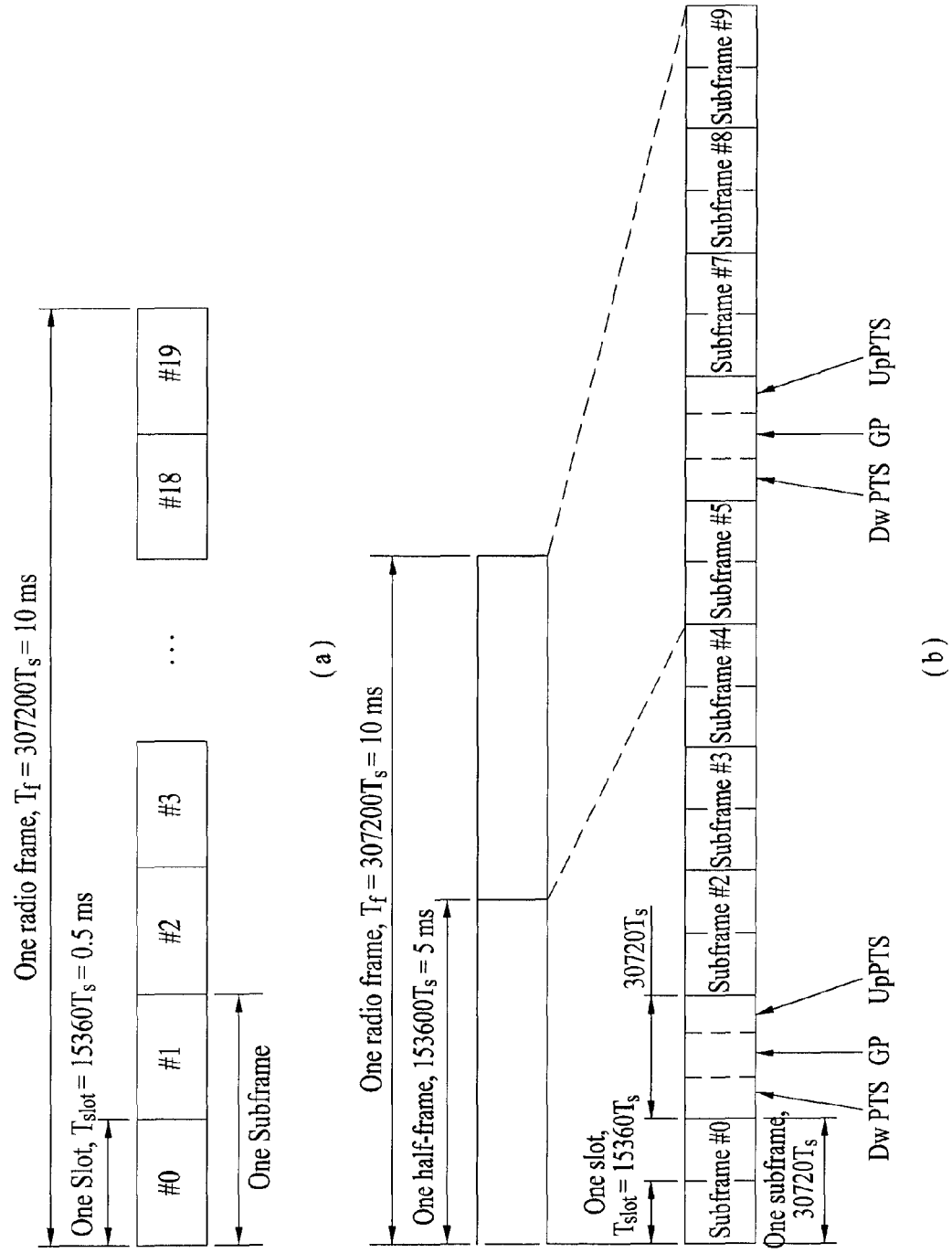
FIG. 1 is a diagram illustrating a radio frame structure for use in a wireless communication system.

Reference will now be made in detail to the preferred embodiments of the present invention, examples of which are illustrated in the accompanying drawings. The detailed description set forth below in connection with the appended drawings is intended as a description of exemplary embodiments and is not intended to represent the only embodiments in which the concepts explained in these embodiments can be practiced. The detailed description includes details for the purpose of providing an understanding of the present invention. However, it will be apparent to those skilled in the art that these teachings may be implemented and practiced without these specific details.

The following technique, apparatus and system is applicable to various wireless multiple access systems. For convenience of description, assume that the present invention is applied to 3GPP LTE(-A). However, the technical features of the present invention are not limited thereto. For example, although the following detailed description is made in detail on the assumption that a mobile communication system is a 3GPP LTE(-A) system, it is applicable to other prescribed mobile communication systems by excluding unique items of the 3GPP LTE(-A) system.

In some instances, well-known structures and devices are omitted in order to avoid obscuring the concepts of the present invention and the important functions of the structures and devices are shown in block diagram form. The same reference numbers will be used throughout the drawings to refer to the same or like parts.

In the present invention, a user equipment (UE) may be fixed or mobile and include various apparatuses which communicate with a base station (BS) and transmit and receive user data and/or a variety of control information. The UE may be referred to as a terminal Equipment, a mobile station (MS), a mobile terminal (MT), a user terminal (UT), a subscriber station (SS), a wireless device, a personal digital assistant (PDA), a wireless modem, a handheld device, etc. In the present invention, a base station (BS) refers to a fixed station which communicates with a UE and/or another BS and exchanges a variety of data and control information. The BS is referred to as an advanced base station (ABS), a node-B (NB), an evolved-NodeB (eNB), a base transceiver system (BTS), an access point (AP), a processing server (PS), etc.

In the present invention, a PDCCH (Physical Downlink Control CHannel)/PCFICH (Physical Control Format Indicator CHannel)/PHICH (Physical Hybrid automatic retransmit request Indicator CHannel)/PDSCH (Physical Downlink Shared CHannel) refers to a set of resource elements or a set of time-frequency resources carrying DCI (Downlink Control Information)/CFI (Control Format Indicator)/downlink ACK/NACK (ACKnowelegement/Negative ACK)/downlink data. In addition, a PUCCH (Physical Uplink Control CHannel)/PUSCH (Physical Uplink Shared CHannel) refers to a set of resource elements or a set of time-frequency resources carrying UCI (Uplink Control Information)/uplink data. In the present invention, in particular, time-frequency resources Or resource elements (REs) allocated to or belonging to PDCCH/PCFICH/PHICH/PDSCH/PUCCH/PUSCH are referred to as PDCCH/PCFICH/PHICH/PDSCH/PUCCH/PUSCH REs or PDCCH/PCFICH/PHICH/PDSCH/PUCCH/PUSCH resources. Accordingly, in the present invention, transmission of a PUCCH/PUSCH by a UE means that an uplink control information/uplink data/random access signal is transmitted on a PUCCH/PUSCH. In the present invention, transmission of a PDCCH/PCFICH/PHICH/PDSCH by a BS means that downlink data/control information is transmitted on a PDCCH/PCFICH/PHICH/PDSCH.

In addition, in the present invention, a CRS (Cell-specific Reference Signal)/DMRS (Demodulation Reference Signal)/CSI-RS (Channel State Information Reference Signal) time-frequency resources (or REs) refer to time-frequency resources (or REs) carrying CRS/DMRS/CSI-RS, REs allocated to CRS/DMRS/CSI-RS or available REs. A subcarrier including a CRS/DMRS/CSI-RS RE is referred to as a CRS/DMRS/CSI-RS subcarrier and an OFDM symbol including a CRS/DMRS/CSI-RS RE is referred to as a CRS/DMRS/CSI-RS symbol. In addition, in the present invention, SRS time-frequency resources (or REs) refer to time-frequency resources (or REs) transmitted from a UE to a BS to carry a sounding reference signal (SRS) used for measurement of an uplink channel state formed between the UE and the BS. A reference signal (RS) refers to a predefined signal known to a UE and a BS and having a special waveform and is referred to as a pilot signal.

Meanwhile, in the present invention, a cell refers to a predetermined geographical region in which a BS, node(s) or antenna port(s) provide a communication service. Accordingly, in the present invention, communication with a specific cell may refer to communication with a BS, node or antenna port for providing a communication service to the specific cell. In addition, a downlink/uplink signal of a specific cell refers to a downlink/uplink signal from/to a BS, node or antenna port for providing a communication service to the specific cell. In addition, channel state/quality of a specific cell refers to channel state/quality of a channel or communication link formed between a UE and a BS, node or antenna port for providing a communication service to the specific cell.

FIG. 1 is a diagram showing the structure of a radio frame used in a wireless communication system. In particular, FIG. 1(a) shows a radio frame structure used in frequency division duplex (FDD) in 3GPP LTE(-A) and FIG. 1(b) shows a radio frame structure used in time division duplex (TDD) in 3GPP LTE(-A).

Referring to FIG. 1, a radio frame used in 3GPP LTE(-A) has a length of 10 ms (307200.Ts) and includes 10 subframes with the same size. The 10 subframes of the radio frame may be numbered. Ts denotes sampling time, and is represented by Ts=1/(2048*15 kHz). Each of the subframes has a length of 1 ms and includes two slots. The 20 slots of one radio frame may be sequentially numbered from 0 to 19. Each of the slots has a length of 0.5 ms. A time for transmitting one subframe is defined as a transmission time interval (TTI). Time resources may be divided by a radio frame number (or a radio frame index), a subframe number (or a subframe index), a slot number (or a slot index), etc.

The radio frame may be differently configured according to duplex mode. For example, in an FDD mode, since downlink (DL) transmission and uplink (UL) transmission are divided according to frequency, a radio frame includes only one of a DL subframe or a UL subframe in a predetermined frequency band of a predetermined carrier frequency. In a TDD mode, since downlink (DL) transmission and uplink (UL) transmission are divided according to time, a radio frame includes both a DL subframe and a UL subframe in a predetermined frequency band of a predetermined carrier frequency.

Table 1 shows a DL-UL configuration of subframes within a radio frame, in a TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe and S denotes a special subframe. The special subframe includes three fields of DwPTS (Downlink Pilot TimeSlot), GP (Guard Period) and UpPTS (Uplink Pilot TimeSlot). DwPTS is a time slot reserved for DL transmission and UpPTS is a time slot reserved for UL transmission.

Figure 2:
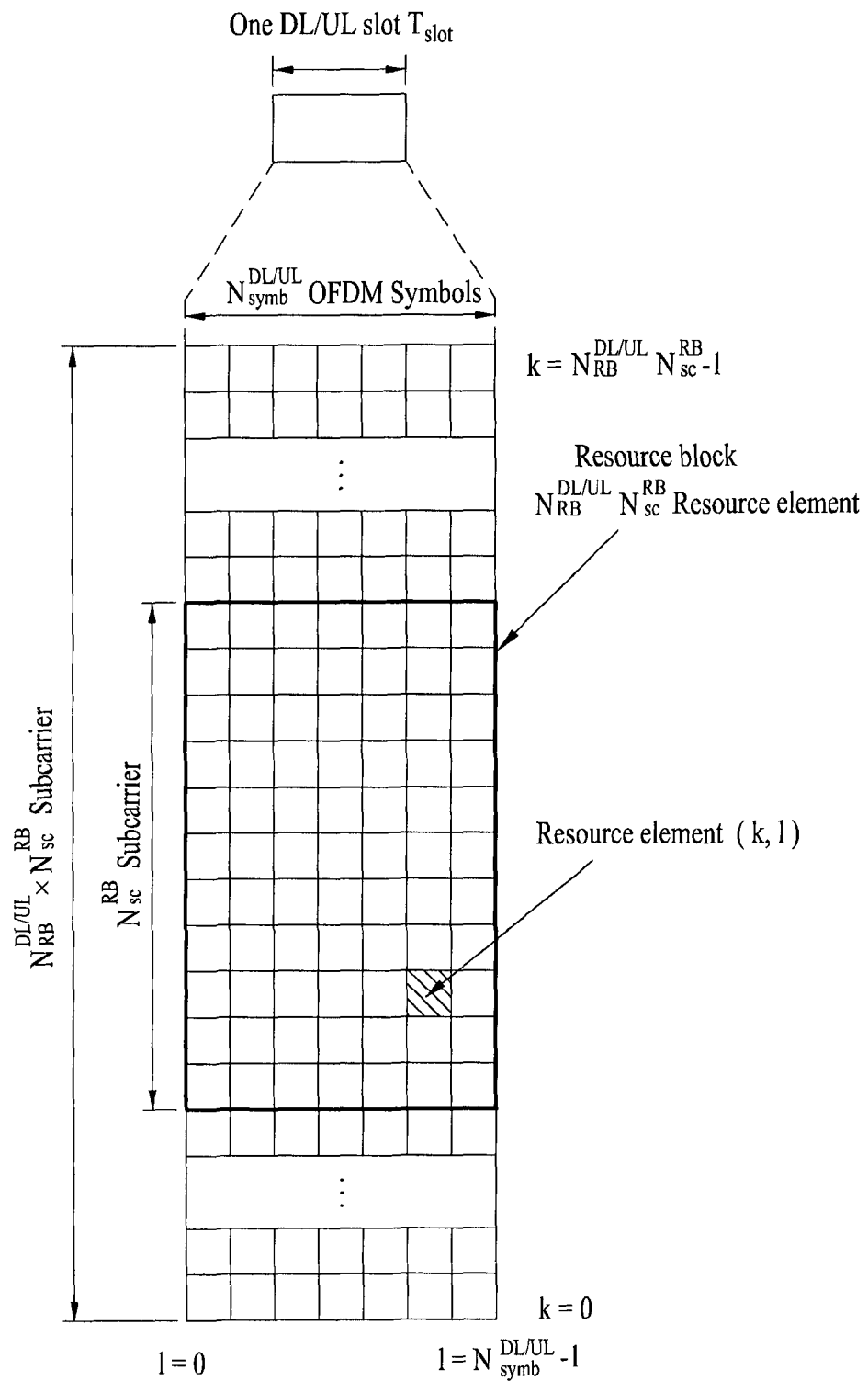
FIG. 2 exemplarily shows a DL/UL slot structure for use in a wireless communication system.

FIG. 2 is a diagram showing an example of a downlink/uplink (DL/UL) slot structure in a wireless communication system. In particular, FIG. 2 shows the structure of a resource grid of a 3GPP LTE(-A) system. One resource grid exists per antenna port.

A slot includes a plurality of orthogonal frequency division multiplexing (OFDM) symbols in a time domain and includes a plurality of resource blocks (RBs) in a frequency domain. The OFDM symbol means one symbol slot. Referring to FIG. 2, a signal transmitted in each slot may be expressed by a resource grid including NDL/ULRB*NRBsc subcarriers and NDL/ULsymb OFDM symbols. NDLRB denotes the number of resource blocks (RBs) in a DL slot and NULRB denotes the number of RBs in a UL slot. NDLRB and NULRB depend on a DL transmission bandwidth and a UL transmission bandwidth. NDLsymb denotes the number of OFDM symbols in a DL slot, NULsymb denotes the number of OFDM symbols in a UL slot, and NRBsc denotes the number of subcarriers configuring one RB.

An OFDM symbol may be referred to as an OFDM symbol, an SC-FDM symbol, etc. according to multiple access scheme. The number of OFDM symbols included in one slot may be variously changed according to channel bandwidth and CP length. For example, in a normal cyclic prefix (CP) case, one slot includes seven OFDM symbols. In an extended CP case, one slot includes six OFDM symbols. Although one slot of a subframe including seven OFDM symbols is shown in FIG. 2 for convenience of description, the embodiments of the present invention are similarly applicable to subframes having a different number of OFDM symbols. Referring to FIG. 2, each OFDM symbol includes NDL/ULRB*NRBsc subcarriers in a frequency domain. The type of the subcarrier may be divided into a data subcarrier for data transmission, a reference signal subcarrier for reference signal transmission and a null subcarrier for a guard band and a DC component. The null subcarrier for the DC component is unused and is mapped to a carrier frequency f0 in a process of generating an OFDM signal or in a frequency up-conversion process. The carrier frequency is also called a center frequency.

One RB is defined as NDL/ULsymb (e.g., 7) consecutive OFDM symbols in a time domain and defined as NRBsc (e.g., 12) consecutive subcarriers in a frequency domain. For reference, resource including one OFDM symbol and one subcarrier is referred to a resource element (RE) or tone. Accordingly, one RB includes NDL/ULsymb*NRBsc REs. Each RE within a resource grid may be uniquely defined by an index pair (k, l) within one slot. k is an index applied from 0 to NDL/ULRB*NRBsc-1 in a frequency domain, and l is an index from 0 to NDL/ULsymb-1 in a time domain.

In one subframe, two RBs respectively located in two slots of the subframe while occupying the same NRBsc consecutive subcarriers is referred to as a physical resource block (PRB) pair. Two RBs configuring a PRB pair have the same PRB number (or the same PRB index). A VRB is a logical resource allocation unit introduced for resource allocation. The VRB has the same size as the PRB. The VRB is classified into a localized VRB and a distributed VRB according to the method of mapping the PRB to the VRB. Localized VRBs are directly mapped to PRBs and thus VRB number (VRB index) directly corresponds to PRB number. That is, nPRB=nVRB. The localized VRBs are numbered from 0 to NDLVRB-1 and NDLVRB=NDLRB. Accordingly, according to the localized mapping method, VRBs having the same VRB number are mapped to RRBs having the same PRB number in a first slot and a second slot. In contrast, the distributed VRB is mapped to the PRB through interleaving. Accordingly, the distributed VRBs having the same VRB number may be mapped to RRBs having different PRB numbers in a first slot and a second slot. Two PRBs which are respectively located in two slots of a subframe and have the same VRB number are referred to as a VRB pair.

Figure 3:
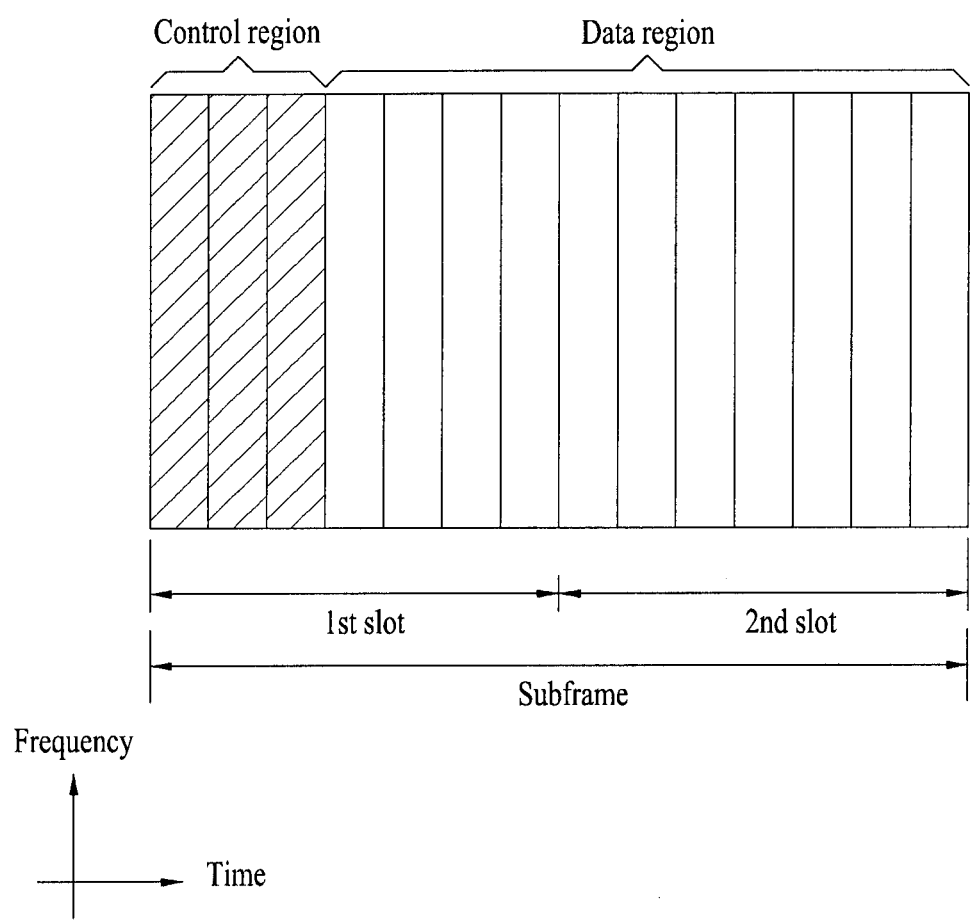
FIG. 3 exemplarily shows a DL subframe structure for use in a 3GPP LTE/LTE-A system.

FIG. 3 is a diagram showing a downlink subframe structure used in a 3GPP LTE(-A) system.

A DL subframe is divided into a control region and a data region in a time domain. Referring to FIG. 3, a maximum of 3 (or 4) OFDM symbols located in a front part of a first slot of a subframe correspond to the control region. Hereinafter, a resource region for PDCCH transmission in a DL subframe is referred to as a PDCCH region. OFDM symbols other than the OFDM symbols used in the control region correspond to the data region to which a physical downlink shared channel (PDSCH) is allocated. Hereinafter, a resource region available for PDSCH transmission in a DL subframe is referred to as a PDSCH region. Examples of a DL control channel used in 3GPP LTE include PCFICH (Physical Control Format Indicator Channel), PDCCH (Physical Downlink Control Channel), PHICH (Physical hybrid ARQ indicator Channel), etc. The PCFICH is transmitted in a first OFDM symbol of a subframe and carries information about the number of OFDM symbols used for transmission of a control channel within a subframe. The PHICH carries a HARQ ACK/NACK (acknowledgment/negative-acknowledgment) as a response to UL transmission.

Control transmitted via a PDCCH is referred to as downlink control information (DCI). The DCI includes resource allocation information of a UE or a UE group and other control information. For example, the DCI includes transmission format and resource allocation information of a DL shared channel (DL-SCH), transmission format and resource allocation information of a UL shared channel (UL-SCH), paging information on a paging channel (PCH), system information on a DL-SCH, resource allocation information of a higher-layer control message such as a random access response transmitted on a PDSCH, a Tx power control command set of individual UEs in a UE group, a Tx power control command, activation indication information of voice over IP (VoIP), etc. The size and usage of the DCI carried by one PDCCH may be changed according to DCI format and the size of the DCI may be changed according to coding rate.

A plurality of PDCCHs may be transmitted in a PDCCH region of a DL subframe. A UE may monitor a plurality of PDCCHs. A BS decides a DCI format according to DCI to be transmitted to a UE and attaches a cyclic redundancy check (CRC) to the DCI. The CRC is masked with an identifier (e.g., a Radio Network Temporary Identifier (RNTI)) according to an owner or usage of the PDCCH. If the PDCCH is for a specific terminal, a cell-RNTI (C-RNTI) of the terminal may be masked to the CRC. Alternatively, if the PDCCH is for a paging message, a paging indicator identifier (P-RNTI) may be masked to the CRC. If the PDCCH is for system information (more specifically, a system information block (SIB)), a system information identifier and a system information RNTI (SI-RNTI) may be masked to the CRC. If the PDCCH is for a random access response, a random access-RNTI (RA-RNTI) may be masked to the CRC. CRC masking (or scrambling) includes an XOR operation of a CRC and an RNTI at a bit level, for example.

A PDCCH is transmitted on one control channel element (CCE) or an aggregate of a plurality of consecutive CCEs. The CCE is a logical allocation unit used to provide a coding rate to a PDCCH based on a radio channel state. The CCE corresponds to a plurality of resource element groups (REGs). For example, one CCE corresponds to nine REGs and one REG corresponds to four REs. Four QPSK symbols are mapped to each REG. An RE occupied by an RS is not included in an REG. Accordingly, the number of REGs within a given OFDM symbol is changed according to presence/absence of an RS. The REG concept is also used for other DL control channels (that is, a PCFICH and a PHICH). A DCI format and the number of DCI bits are determined according to the number of CCEs.

CCEs are numbered and consecutively used and, in order to simplify decoding, a PDCCH having a format composed of n CCEs may start from only a CCE having a number corresponding to a multiple of n. The number of CCEs used to transmit a specific PDCCH, that is, a CCE aggregation level, is determined by a BS according to a channel state. For example, in case of a PDCCH for a UE having a good DL channel (e.g., a UE adjacent to a BS), one CCE may be sufficient. However, in case of a PDCCH for a UE having a bad channel (e.g., a UE located at a cell edge), 8 CCEs are required to obtain sufficient robustness.

may be allocated to the control region in order to carry uplink control information (UCI). One or several physical uplink shared channels (PUSCHs) may be allocated to the data region of the UL subframe in order to carry user data. The control region and the data region in the UL subframe are also referred to as a PUCCH region and a PUSCH region, respectively. A sounding reference signal (SRS) may be allocated to the data region. The SRS is transmitted on a last OFDM symbol of a UL subframe in a time domain and is transmitted on a data transmission band, that is, a data region, of the UL subframe. SRSs of several UEs, which are transmitted/received on the last OFDM symbol of the same subframe, are distinguished according to frequency location/sequence.

If a UE employs an SC-FDMA scheme in UL transmission, in order to maintain a single carrier property, in a 3GPP LTE release-8 or release-9 system, a PUCCH and a PUSCH may not be simultaneously transmitted on one carrier. In a 3GPP LTE release-10 system, support of simultaneous transmission of a PUCCH and a PUSCH may be indicated by a higher layer.

In a UL subframe, subcarriers distant from a direct current (DC) subcarrier are used as the control region. In other words, subcarriers located at both ends of a UL transmission bandwidth are used to transmit uplink control information. A DC subcarrier is a component which is not used to transmit a signal and is mapped to a carrier frequency f0 in a frequency up-conversion process. A PUCCH for one UE is allocated to an RB pair belonging to resources operating in one carrier frequency and RBs belonging to the RB pair occupy different subcarriers in two slots. The allocated PUCCH is expressed by frequency hopping of the RB pair allocated to the PUCCH at a slot boundary. If frequency hopping is not applied, the RB pair occupies the same subcarrier.

The size and usage of UCI carried by one PUCCH may be changed according to PUCCH format and the size of the UCI may be changed according to a coding rate. For example, the following PUCCH format may be defined.

TABLE 2

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Figure 4:
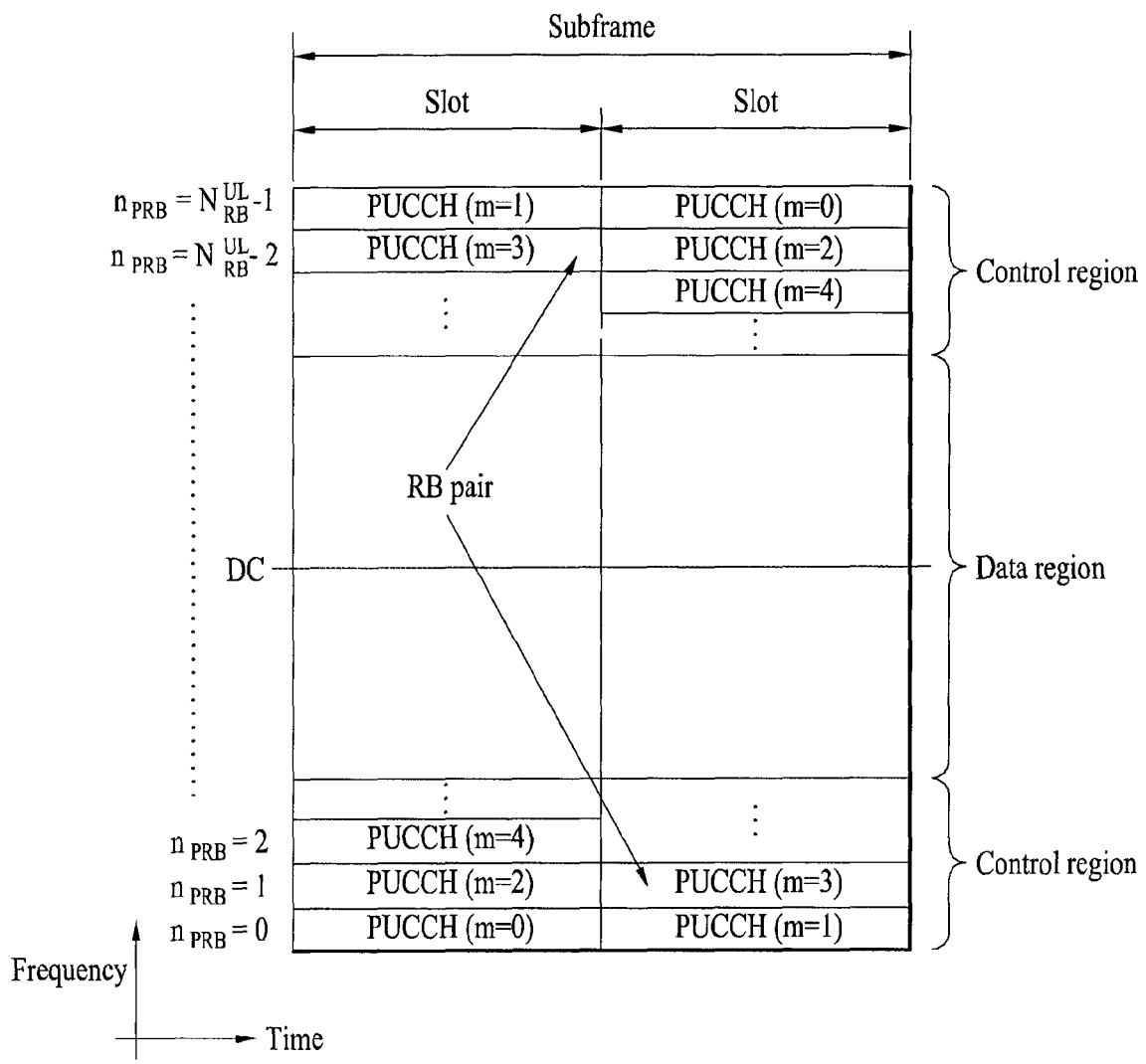
FIG. 4 exemplarily shows an UL subframe structure' for use in a 3GPP LTE/LTE-A system.

FIG. 4 is a diagram showing an example of an uplink subframe structure used in a 3GPP LTE(-A) system.

Referring to FIG. 4, a UL subframe may be divided into a control region and a data region in a frequency domain. One or several physical uplink control channels (PUCCHs)

Referring to Table 2, PUCCH format 1 series and PUCCH format 3 series are used to transmit ACK/NACK information and PUCCH format 2 series are mainly used to carry channel state information such as CQI (channel quality indicator)/PMI (precoding matrix index)/RI (rank index).

FIG. 5 illustrates a configuration of a wireless communication system having multiple antennas.

As shown in FIG. 5(a), if the number of transmit antennas is increased to NT and the number of receive antennas is increased to NR, theoretical channel transmission capacity is increased in proportion to the number of antennas, unlike the case where a plurality of antennas is used in either a transmitter or a receiver. Accordingly, it is possible to improve transmission rate and to remarkably enhance frequency efficiency. As the channel transmission capacity is increased, the transmission rate may be theoretically increased by a product of a maximum transmission rate RO upon using a single antenna and a rate increase ratio Ri.

$$R_i = \min(N_T, N_R) \qquad \text{[Equation 1]}$$

For example, in a MIMO communication system using four transmit antennas and four receive antennas, a transmission rate which is four times that of a single antenna system may be theoretically obtained.

A communication method in the MIMO system is described in more detail using mathematical modeling. In the above system, it is assumed that NT transmit antennas and NR receive antennas are present.

In a transmission signal, if NT transmit antennas are present, a maximum number of pieces of transmission information is NT. The transmission information may be expressed as follows.

$$s = [s_1, s_2, \ldots, s_{N_T}]^T \qquad \text{[Equation 2]}$$

Individual transmission information pieces $s_1, s_2, \ldots, s_{N_T}$ may have different transmit powers. If the respective transmit powers are denoted by $P_1, P_2, \ldots, P_{N_T}$, transmission information having adjusted powers may be expressed as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

In addition, $\hat{S}$ may be expressed using a diagonal matrix P of a transmit power as follows $$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

It is assumed that NT transmission signals $x_1, x_2, \ldots, x_{N_T}$ to be actually transmitted are configured by applying a weight matrix W to the transmit power adjusted information vector $\hat{S}$. The weight matrix W serves to appropriately distribute transmission information to individual antennas according to a transport channel situation. $x_1, x_2, \ldots, x_{N_T}$ may be expressed using a vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{[Equation 5]}$$

where, $w_{ij}$ denotes a weight between an i-th transmit antenna and a j-th information. W is also called a precoding matrix.

If NR receive antennas are present, respective reception signals $y_1, y_2, \ldots, y_{N_R}$ of the antennas may be expressed as follows.

$$y = [y_1, y_2, \ldots, y_{N_R}]^T \qquad \text{[Equation 6]}$$

In modeling channels of the MIMO wireless communication system, the channels may be distinguished from each other according to transmit/receive antenna indexes. A channel passing from a transmit antenna j to a receive antenna i is denoted as $h_{ij}$. In an index order of $h_{ij}$ it is noted that an index of a receive antenna precedes an index of a transmit antenna.

FIG. 5(b) illustrates channels passing from the NT transmit antennas to the receive antenna i. The channels may be expressed in the form of a combination of a vector and a matrix. In FIG. 5(b), the channels passing from the NT transmit antennas to the receive antenna i may be represented as follows.

$$h_i^T = [h_{i1}, h_{i2}, \ldots, h_{iN_T}] \qquad \text{[Equation 7]}$$

Accordingly, all channels passing from the NT transmit antennas to the NR receive antennas may be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \qquad \text{[Equation 8]}$$

Additive White Gaussian Noise (AWGN) is added to actual channels passing through the channel matrix H. AWGN $n_1, n_2, \ldots, n_{N_R}$ added to the respective NR receive antennas may be expressed as follows.

$$n = [n_1, n_2, \ldots, n_{N_R}]^T \qquad \text{[Equation 9]}$$

According to the above-described mathematical modeling method, a reception signal may be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \qquad \text{[Equation 10]}$$

Meanwhile, the numbers of rows and columns of the channel matrix H indicating a channel state are determined by the number of transmit and receive antennas. The number of rows of the channel matrix H is equal to the number of receive antennas, NR, and the number of columns thereof is equal to the number of transmit antennas, NT. That is, the channel matrix H is an NR×NT matrix.

A matrix rank is defined by the smaller of the number of rows and the number of columns, where the rows and the columns are independent of each other. Accordingly, the matrix rank cannot be greater than the number of rows or columns. The rank of the channel matrix H, rank(H), is restricted as follows.

$$\text{rank}(H) \leq \min(N_T, N_R) \qquad \text{[Equation 11]}$$

Another definition of rank may be given as the number of non-zero Eigen values when a matrix is subjected to Eigen value decomposition. Similarly, rank may be defined as the number of non-zero singular values when a matrix is subjected to singular value decomposition. Accordingly, the physical meaning of rank in a channel matrix may be a maximum number of elements capable of transmitting different information via a given channel.

Presently, various wireless devices are widely used throughout the world, such that the number of service types is rapidly increasing. Assuming that past radio data transmission is achieved on the basis of audio data (especially, voice data), current radio data transmission has been developed in various formats such as audio, video, photo, and document transmission forms, such that a data transfer rate is exponentially increased. As such, wireless communication standards for providing a higher transfer rate have recently been proposed. For example, LTE(-A) acting as one representative example of the next generation cellular communication can communicate with another party at a higher speed (i.e., a maximum transfer rate of 1 GB/s) that is faster than that of HSDPA by twelve times or greater, using OFDM and MIMO technologies. However, wireless communication standards capable of transmitting data at high speed can be achieved on the assumption of ideal environmental factors such as speed, channel environment, time/frequency allocation, etc. A data transfer rate capable of being actually experienced by a user is substantially lower than the maximum speed of the wireless communication standards. Specifically, performance of a wireless communication device considering a wireless channel environment is greatly influenced by a channel environment between transceiver devices of signals. Representative examples may be the presence or absence of an obstacle, the distribution of obstacles, device movement speed, etc. In case of using MIMO technology, as one important technology capable of improving data transfer rate, device restrictions caused by the design and arrangement of antennas may affect the MIMO technology.

Figure 6:
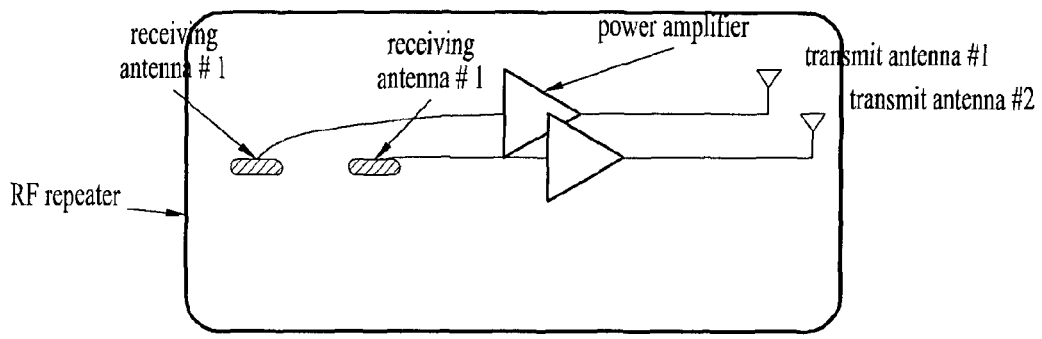
FIG. 6 is a block diagram illustrating a radio signal (RF) amplifier according to one embodiment of the present invention.

Under various environmental and physical restricted situations, a repeater capable of amplifying RF signals may be used to compensate for performance deterioration of wireless devices. In case of using a general RF repeater, a method for receiving an RF signal of a wireless device, amplifying a signal including noise and interference, and retransmitting the amplified signal has been used. FIG. 6 is a conceptual diagram illustrating a general RF signal amplifier.

Figure 7:
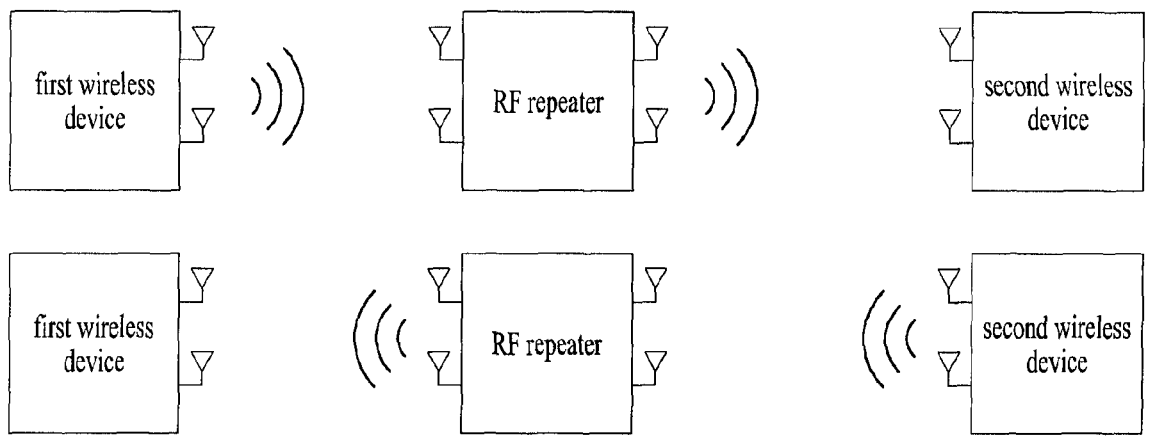
FIG. 7 shows a wireless communication environment according to one embodiment of the present invention.
Figure 8:
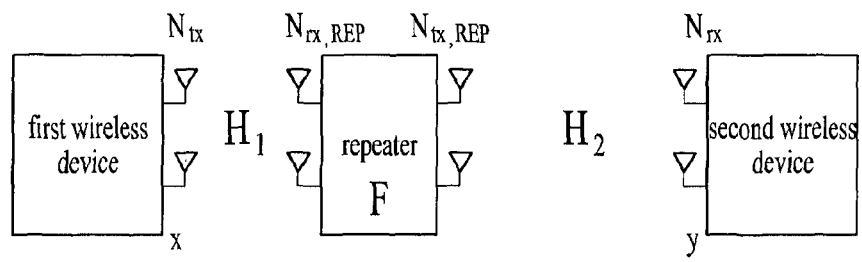
FIG. 8 exemplarily shows mathematical modeling of a wireless communication environment according to one embodiment of the present invention.

A MIMO signal amplifier (i.e., a MIMO repeater) is generally located between a first wireless device and a second wireless device as shown in FIG. 7, the signal amplifier (i.e., a repeater) receives and amplifies a transmission signal of the first wireless device, and transmits the amplified signal to the second wireless device. Simultaneously or alternately, the signal amplifier (i.e., a repeater) receives and amplifies a transmission signal of the second wireless device, and transmits the amplified signal to the first wireless device. In this case, the term "wireless device" may conceptually include all of a base station (BS), a user equipment (UE), and their equivalents. Although Tx/Rx antennas of the RF repeater may be embedded into the RF repeater, assuming that a material (e.g., an outer wall of a building) interrupting signal transmission is located between the first wireless device and the second wireless device, some antennas may be installed outside of the RF repeater to remove the influence caused by the signal transmission material, such that the antennas may be coupled to the signal amplifier by wire.

Referring to FIG. 7, functions of the RF repeater located adjacent to the first wireless device may be classified into a first function (i.e., function for amplifying the transmission signal) for amplifying a transmission signal of the first wireless device and transmitting the amplified signal to the second wireless device, and a second function (i.e., function for amplifying the reception signal) for receiving and amplifying a transmission signal from the second wireless device and transmitting the amplified signal to the first wireless device. The present invention proposes a signal repeater antenna configuration and link generation scheme for enabling the device-adjacent-type RF repeater to optimize the Tx signal amplification function.

Mathematical modeling of the MIMO RF repeater system will hereinafter be described in detail. Generally, MIMO channels composed of Ntx Tx antennas and Nrx Rx antennas may be modeled by a (Nrx×Ntx) matrix (i.e., (Nrx by Ntx) matrix) within a frequency domain assuming frequency flat fading. Although the MIMO channel is extended to a frequency selective broadband channel, it may be modeled into the (Nrx×Ntx) matrix for each subframe, and an independent MIMO Tx/Rx scheme for each subcarrier may be applied to a MIMO-OFDM system. Therefore, the following description may be based on narrowband channel modeling for convenience of description. The case in which the following result is extended to broadband will be described later.

It is assumed that the number of Tx antennas of the first wireless device is denoted by Ntx, the number of Rx antennas of the second wireless device is denoted by Nrx, the number of Rx antennas of the RF repeater is denoted by Nrx,REP, and the number of Tx antennas of the RF repeater is denoted by Ntx,REP. In this case, a channel between the first wireless device and the RF repeater may be modeled into a (Nrx,REP×Ntx) matrix (H1), and a channel between the second wireless device and the RF repeater may be modeled into a (Nrx×Ntx,REP) matrix (H2). Assuming that the RF repeater is a linear system for connecting signals received through Nrx,REP antennas to Ntx,REP antennas and then amplifying the connected resultant signals, the result may be modeled into a (Ntx,REP×Nrx,REP) matrix (F). Therefore, assuming that signals transmitted through antennas of the first wireless device are denoted by a (Ntx×1) vector (x), the (Nrx×1) vector (y) received through the antenna of the second wireless device is represented by the following equation 12.

$$y = H_2 F H_1 x + H_2 F z_1 + z_2 \qquad \text{[Equation 12]}$$

In Equation 12, $z_1$ is noise and interference received through Rx antennas of the RF repeater, and $z_2$ is noise and interference received through Rx antennas of the second wireless device.

If the first wireless device is located close to the RF repeater, the distance and the beampattern direction between each Tx antenna of the first wireless device and each Rx antenna of the RF repeater may be changed. Therefore, respective elements of the channel H1 have different average magnitudes differently from a general MIMO channel. For example, it is assumed that Tx antennas of the first wireless device and the Rx antennas of the RF repeaters are configured as shown in FIG. 9. Assuming that the first wireless device is mounted to the RF repeater (i.e., if the first wireless device is placed on the RF repeater), the first Rx antenna (Ant1,A) of the RF repeater A will receive a relative strong signal from the first Tx antenna (Ant1) of the first wireless device, and the second Rx antenna (Ant2,A) will receive a relative strong signal from the second Tx antenna (Ant2) of the first wireless device. The antenna position of the RF repeater greatly affects performance of the RF repeater due to unique characteristics of the contiguous channel (H1). For example, assuming that the RF repeater B is used in FIG. 9, the RF repeater B may more strongly amplify an output signal of the first Tx antenna (Ant1) of the first wireless device, such that it may distort a effective channel (corresponding to H2FH1 of Equation 12), resulting in deterioration of MIMO performance of the first wireless device. In more detail, a effective channel is formed as if only one Tx antenna is used even though the first wireless device has two Tx antennas in the case of using the RF repeater B, such that it may be difficult to obtain a sufficient spatial diversity gain.

Assuming that the antenna position of the RF repeater is well designed, although spatial correlation characteristics of multiple antennas of the first wireless device are poor, the RF repeater can overcome the poor spatial correlation characteristics, such that MIMO performance can be maximized. For example, although correlation among Tx antennas of the first wireless device is very high, assuming that Rx antennas of the RF repeater are adjacent to Tx antennas on a one to one basis and correlations among Tx antennas of the RF repeater are low, it may be possible to obtain the effect that poor-quality Tx antennas of the first wireless device are replaced with high-performance Tx antennas of the RF repeater. That is, Tx correlation of H2FH1 corresponding to a effective channel in Equation 12 may be reduced by either well-designing the F value corresponding to signal transmission (channel) characteristics of the RF repeater or matching a physical position of the Rx antenna of the RF repeater to the Tx antenna of the first wireless device, and thus a contiguous channel H1 is diagonalized. Therefore, Rx antennas of the RF repeater must be physically or algorithmically mapped to Tx antennas of the Tx antennas of the first wireless device on a one to one basis, so that a link should be formed. Assuming that the RF repeater is universally used, it is difficult to match physical antenna positions to all kinds of first wireless devices. Therefore, the embodiments of the present invention propose the following proposals.

First Proposal: The RF repeater configured to amplify and transmit signals of the first wireless device has many more Tx antennas than Tx antennas (where Ntx,REP<Nrx,REP), selects M signals (where M≤Nrx,REP) from among signals received through each Rx antenna, connects the selected signals to Tx antennas, and amplifies the connected resultant signals. In this case, M signals (where M≤Nrx,REP) are selected from among signals received from each Rx antenna, the selected M signals are connected to Tx antennas and then amplified. In this case, a positive (+) integer M is decided as one of the following parameters Ntx, Ntx,REP, Nrx,REP, and the number of Rx signals each having a quality having a specific threshold or greater. Here, Ntx is the number of Tx antennas of the first wireless device, Ntx,REP is the number of Tx antennas of the RF repeater, and (Nrx,REP) is the number of Rx antennas of the RF repeater.

Second Proposal: The RF repeater configured to amplify and transmit signals of a contiguous first wireless device has many more Tx antennas than Tx antennas of the first wireless device (where Ntx<Ntx,REP), selects M signals from among signals received through each Rx antenna according to the first proposal, connects the selected signals to N Tx antennas, and amplifies the connected resultant signals. In this case, a positive (+) integer N is decided to be one of the following parameters M, Ntx, and Ntx,REP. Here, Ntx is the number of Tx antennas of the first wireless device, and Ntx,REP is the number of Tx antennas of the RF repeater.

In accordance with the transmission link generation scheme proposed by the present invention, if an optimum transmission link generation scheme is decided once, in so far as the position of the first wireless device may be changed or an event for changing the first wireless device is changed to another device does not occur, the above-mentioned transmission link generation scheme can be maintained. Assuming that the weighted sum scheme is applied to link combination, a weight value may be changed according to an instantaneous channel situation. However, the link grouping/combination scheme, and the link distribution scheme, etc. may be maintained in so far as the event does not the event. A detailed description of the link grouping, the link combination, and the link distribution will hereinafter be described in detail.

A reference for selecting M Rx signals from among Nrx,REP Rx signals according to the Tx link formation method proposed by the present invention may be ① values (for example, intensity of Rx signal, energy, strength, SNR, SINR, etc.) for indicating a quality of each Rx signal. Another reference for selecting the M Rx signals may be ② quality of each Rx signal for a specific Rx signal.

In accordance with the latter example, the quality of each Rx signal is separated from each Tx antenna of the first wireless device, is measured, such that some Rx signals each having superior quality may be primarily selected. In order to use the above-mentioned scheme, there is needed a method for separating a Tx signal of each Tx antenna of the first wireless device from the Rx signal of each Rx antenna of the RF repeater, and measuring/comparing the separated Tx signal. For this purpose, the first wireless device may utilize a reference signal that is identified and transmitted per antenna or per antenna port. The following description assumes that the first wireless device is an LTE(−A) UE, a sounding reference signal (SRS) from among reference signals identified per antenna is utilized so that the RF repeater measures and compares the quality of each Tx antenna of the first wireless device according to one embodiment of the present invention.

First step: UL/DL system bandwidth between a first wireless device (for example, UE) and a second wireless device (for example, BS) is sensed.

Second step: A downlink synchronization signal transmitted through predetermined time and frequency resources is received from the second wireless device, such that a physical cell ID is obtained.

Third Step: UL SRS is detected using the obtained physical cell ID according to the blind decoding scheme so as to detect UL SRS, and the number of Tx antennas of the first wireless device and Rx power for each antenna is measured.

The case of initial detection: In association with all SRS bandwidths capable of being generated by 8 SRS sequences using 8 cyclic shift (CS) values, all SRS bandwidths can be found at all available resource block (RB) positions.

The number of blind decoding times: 8 CS values per subframe×N SRS transmission band candidates (for example, UL RBs=48 (the case of 10 MHz), and N=33) (blind decoding is carried out at a maximum of first four subframes)

After completion of initial detection, a CS value and an SRS transmission bandwidth are fixed, and the next SRS is periodically found at the periodically transmittable positions according to the SRS hopping pattern.

Figure 10:
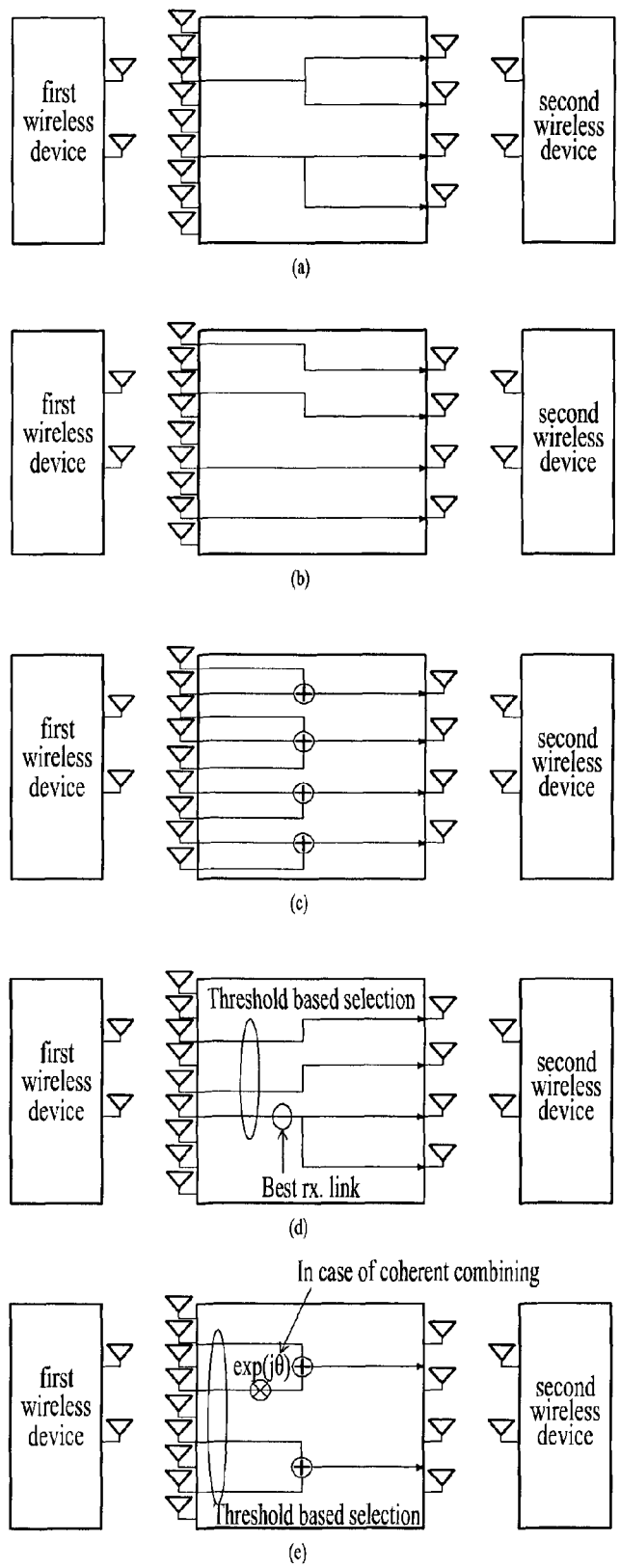
FIG. 10 is a conceptual diagram illustrating a link mapping scheme according to one embodiment of the present invention.

FIG. 10 exemplarily shows various link decision schemes. The number of Tx/Rx antennas of the RF repeater should be higher than the number of Tx antennas of the first wireless device (i.e., Nrx,REP>Ntx and Ntx,REP>Ntx) so that performance can be maximized. Therefore, Ntx=2, Nrx=2, Nrx,REP=9, and Ntx,REP=4 are assumed in FIG. 10. The link decision scheme according to the present invention refers to a method for mapping a plurality of Rx signals received through Rx antennas to a plurality of Tx antennas from the viewpoint of the RF repeater, and is largely classified into link distribution and link combination.

The link decision scheme shown in FIG. 10(a) selects as many signals (M=Ntx) as the number of Tx antennas of the first wireless device from among Rx streams of Rx antennas of the RF repeater, and transmits the selected signals to Tx antennas (or Tx amps) of the RF repeater. If the number of Tx antennas of the RF repeater is higher than M, link distribution may be achieved as shown in FIG. 10(a). Here, the link distribution may indicate that a single Rx signal (link) is mapped to a plurality of Tx antennas.

If M selected signals are distributed to many more Tx antennas, the number of branches of each Rx signal may be differently changed according to individual Rx signals. For example, in case of M=3 and Ntx,REP=4, only one Rx signal from among three selected Rx signals may be divided into two parts, and then mapped. For better signal amplification, a good-quality Rx signal may be divided into many more signals as necessary. It is more preferable that the best-quality (e.g., Rx signal intensity, SINR, etc.) Rx signal from among three selected Rx signals be divided into two parts such that many more signals having superior quality can be utilized. Although the number of Tx antennas of the RF repeater is higher than M, link distribution is not always used. For example, M selected links are connected to M Tx antennas on a one to one basis without using link distribution, and some links (M links) from among Tx antennas of the RF repeater may be used as necessary. Alternatively, some Tx antennas of the RF repeater may be used as a hybrid type, and all or some links of the selected links may be mapped in a branch format. For example, in case of M=3 and Ntx,REP=7, each of three selected Rx signals is mapped to two Tx antennas, such that the Tx signal can be amplified only using a total of 6 Tx antennas. In order to utilize the scheme of FIG. 10(a), the RF repeater needs to recognize the number of Tx antennas of the first wireless device.

The link decision scheme shown in FIG. 10(b) selects as many Rx signals (M=Ntx,REP) as the number of Tx antennas of the RF repeater, such that the selected Rx signals are mapped to Tx antennas of the RF repeater on a one to one basis.

The link decision scheme shown in FIG. 10(c) maps signals (M=Nrx,REP) of Rx antennas of the RF repeater to Tx antennas. As shown in FIG. 10(c), assuming that the number (Nrx,REP) of Rx antennas of the RF repeater is higher than the number (Ntx,REP) of Tx antennas, all or some signals must be combined and mapped. Link combination must be classified into a link grouping method and a link combination method.

The link grouping method is a method for grouping M links into Ntx,REP groups, and the link combination method is a method for collecting links of a group into one signal (one link) and transmitting the signal (or link) to the corresponding Tx antenna. In association with the link grouping method, although links may be grouped at random according to antenna configuration, the present invention proposes a grouping method in consideration of the relationship between the quality (e.g., intensity, SINR, etc. of Rx signal) of each link and/or the Tx antenna of the first wireless device.

As one example of the grouping method considering the link quality, in the case of using good-quality links, a relatively small number of links are grouped. In the case of using poor-quality links, a relatively large number of links are grouped, the quality of combined signals may be equalized as much as possible.

In the case of using Ntx=Nrx=Ntx,REP=2 and Nrx,REP=4 as one exemplary grouping method considering the relationship for the Tx antennas of the first wireless device, it is assumed that a signal received through a first Tx antenna of the first wireless device from among signals received through the first and second antennas of the RF repeater is dominant and signals received through third and fourth Rx antennas of the RF repeater are dominant. In this case, when the RF repeater performs grouping of a total of Rx signals, signals (links) from the first Rx antenna and the second Rx antenna are grouped into a first group in consideration of the relationship associated with Tx antennas of the first wireless device, and signals from the third and fourth Rx antennas are grouped into a second group. That is, links highly associated with Tx antennas of the first wireless device are combined with each other. In this case, when the grouped links are combined and transmitted to Tx antennas of the RF repeater, Tx signals from Tx antennas of each RF repeater are mapped to Tx antennas of different first wireless devices, such that Tx-antenna correlation characteristics are improved (i.e., are reduced) and at the same time the same signals are collected in such a manner that it is possible to perform subsequent coherent combining to be described later.

In the link combining step, the link adding scheme and the weighted sum scheme in which different phase values and/or magnitude values are multiplied by links to be combined may be used as shown in FIG. 10(c). If link grouping is carried out by the relationship associated with Tx antennas of the first wireless device as shown in the above example, in order to compensate for a phase difference between a first distance and a second distance (where the first distance between the first Tx antenna of the first wireless device and the first Rx antenna of the RF repeater, and the second distance between the Tx antenna of the first wireless device and the second Rx antenna of the RF repeater), it is possible to use the coherent combining scheme in which a value corresponding to the phase difference is multiplied by one of two links and then combined. And/or, in order to compensate for unbalance caused by a gain difference between two links, different magnitude values may be multiplied and combined as necessary. That is, in order to compensate for a difference between a first channel state and a second channel state (where the first channel state between the first Tx antenna of the first wireless device and the first Rx antenna of the RF repeater, and the second channel state between the first Tx antenna of the first wireless device and the second Rx antenna of the RF repeater), a phase and/or a gain may be adjusted.

In the case of using the weighted sum scheme, a weight applied to each link may be instantaneously updated in response to real-time channel variation between the first wireless device and the RF repeater. However, the weight may be semi-statically fixed in response to average channel characteristics (for example, a distance between each Tx antenna of the first wireless device and each Rx antenna of the RF repeater) in consideration of implementation complexity and associated performance trade-off.

The link decision scheme shown in FIG. 10(d) determines the number (M) of Rx selected signals to be the number of links each having a specific threshold quality or greater, such that the number (M) of Rx selected signals is variably determined according to a channel state. In this case, the above quality may be measured in various metrics such as signal power, energy, strength, SNR, SINR, etc., and may also be the quality of the overall Rx signals. However, the above-mentioned quality may also be a quality of Rx signal transmitted (or received) from each Tx antenna of the first wireless device as described above as necessary. For example, if the first wireless device has a plurality of Tx antennas, a link having a specific signal quality or greater may be selected from each Tx antenna. In addition, In addition, although a threshold quality value may be a threshold value of an absolute quality value, a threshold value of a relative quality may be used. For example, although each link having Rx signal power of more than a specific threshold value can be selected, assuming that each Rx signal power is denoted by xi (where i=1, . . . , Nrx,REP), each Rx signal in which Rx power of the corresponding link with respect to minimum Rx power is equal to or higher than specific threshold power can be selected. In addition, assuming that M is selected on the basis of a specific threshold value, M has variable characteristics according to environments (e.g., categories of the first wireless device). Accordingly, M may be higher or smaller than the number (Ntx, REP) of Tx antennas. In case of M<Ntx,REP, the link distribution method or a method for deactivating (e.g., turning off) some parts of Tx antennas may be used without change as shown in FIG. 10. In the case of link distribution, the best-quality link from among a plurality of distributed links may be primarily distributed without change, as shown in FIG. 10(d). In case of M>Ntx,REP, link grouping and link combining may be achieved as shown in FIG. 10(c). In the case of link grouping as described above, link grouping may be performed in consideration of the relationship between the quality of each link and/or each Tx antenna of the first wireless device. In addition, the simple sum scheme or the weighted sum scheme may be used for link combing. FIG. 10(e) shows coherent combining applied to some link combining according to one embodiment of the present invention.

If selection based on a specific threshold is achieved, the corresponding specific threshold value may be pre-established in the RF repeater, and the RF repeater may measure signals of the first wireless device and may establish the signals alone. In addition, a threshold value may be set to a different value according to categories of the first wireless device and the number of Tx antennas in any of cases. Alternatively, the threshold value may also be received from the first wireless device through a separate communication link.

Figure 11:
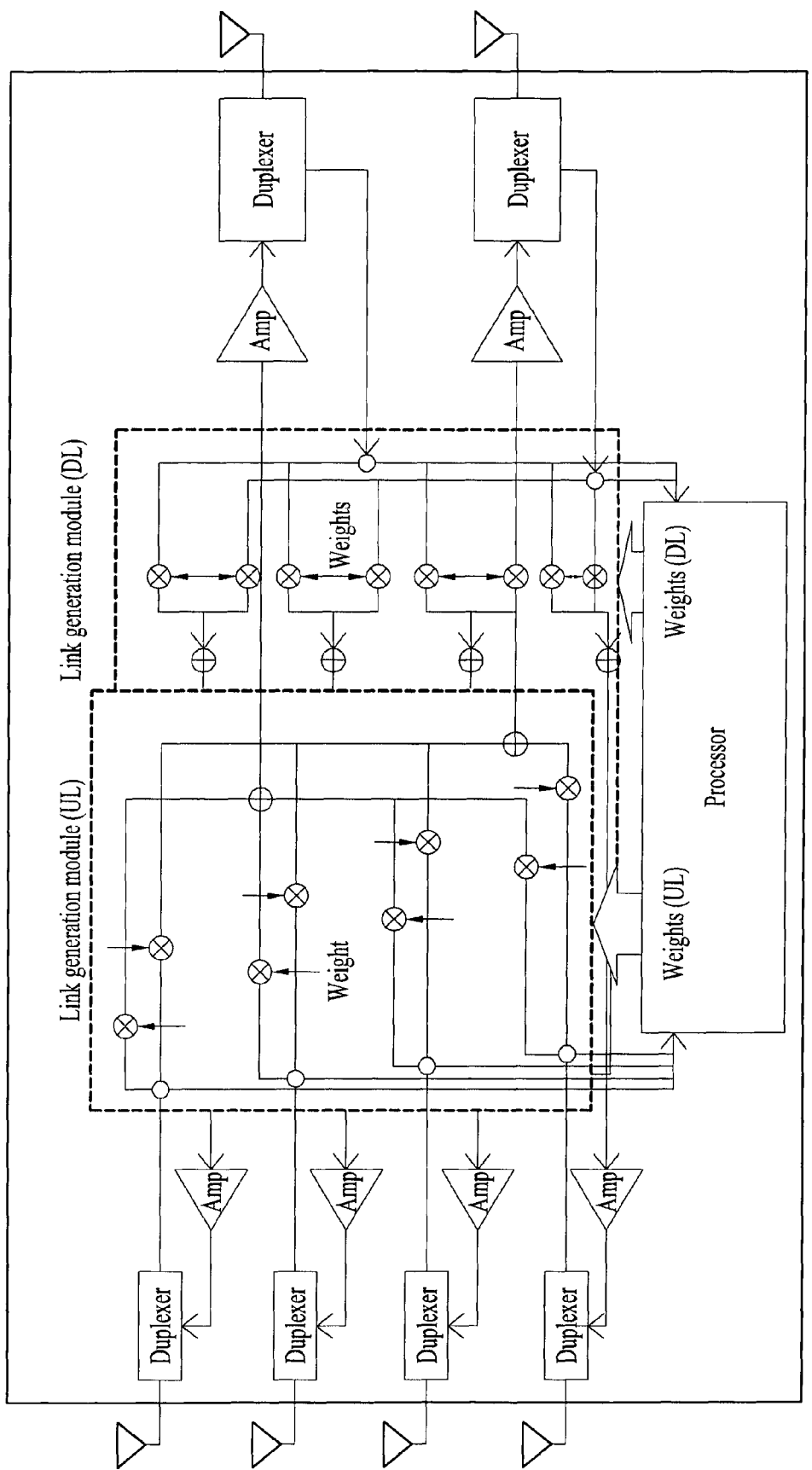
FIG. 11 is a block diagram illustrating a radio frequency (RF) amplifier according to one embodiment of the present invention.

FIG. 11 shows one example of the RF repeater to which the proposed signal amplification scheme is applied. In FIG. 11, it is assumed that the first wireless device is a UE, the second wireless device is a BS or eNB, Nrx,REP is set to 4 (Nrx,REP=4), and Ntx,REP is set to 2 (Ntx,REP=2). In FIG. 11, the RF repeater is configured to perform both a Tx-signal amplification function and an Rx-signal amplification function of the first wireless device. A link generation scheme proposed by the present invention corresponds to a method for controlling an uplink generation module corresponding to the Tx signal amplification function.

A link generation method for Tx signal amplification and a link generation method for Rx signal amplification may be different from each other as shown in FIG. 11. However, assuming that the first wireless device uses an antenna for both Tx/Rx usage, the link generation scheme of FIG. 10(a) may be used by inversely applying the link generation scheme associated with Tx signal amplification. For example, it is assumed that the Tx signal amplification scheme is decided as shown in FIG. 10(a). That is, a third Rx antenna and a sixth Rx antenna of the RF repeater are selected. Assuming that this link generation scheme is inversely applied to Rx signal amplification, the first and second Tx antennas of the RF repeater are link-combined with the third Rx antenna, and the third and fourth Tx antennas of the RF repeater are link-combined with the sixth Rx antenna.

If the antenna configuration and Tx-signal link generation scheme of the RF repeater proposed by the present invention are extended to a broadband system, the link generation scheme for different Tx signals and/or the antenna configuration may be designed per frequency band (capable of being replaced with various frequency units such as band, subband, RB, carrier, subcarrier, etc.). Specifically, assuming that the weighted sum scheme is applied to the link combining scheme, there is a high possibility that different optimum weights are assigned to respective frequencies. However, considering implementation complexity and associated performance gain trade-off, the above-mentioned method is considered to be a good method for applying the same link generation method to all bands.

[Simulation]

In order to testify technical effects of the embodiments of the present invention, the simulation result is as follows.

[1.1: Simulation Setup]

It is assumed that the environment in which two antennas (or two antenna ports) are used for each link is used, i.e., Ntx=Nrx,REP=Ntx,REP=Nrx=2.

Except for Tx antennas of the first wireless device (UE), it is assumed that there is no spatial correlation.

The RF repeater assumes simple A/F (i.e., F=I).

The A/F is referred to a scheme for amplifying and forwarding.

[1.2: Simulation 1]

Figure 12:
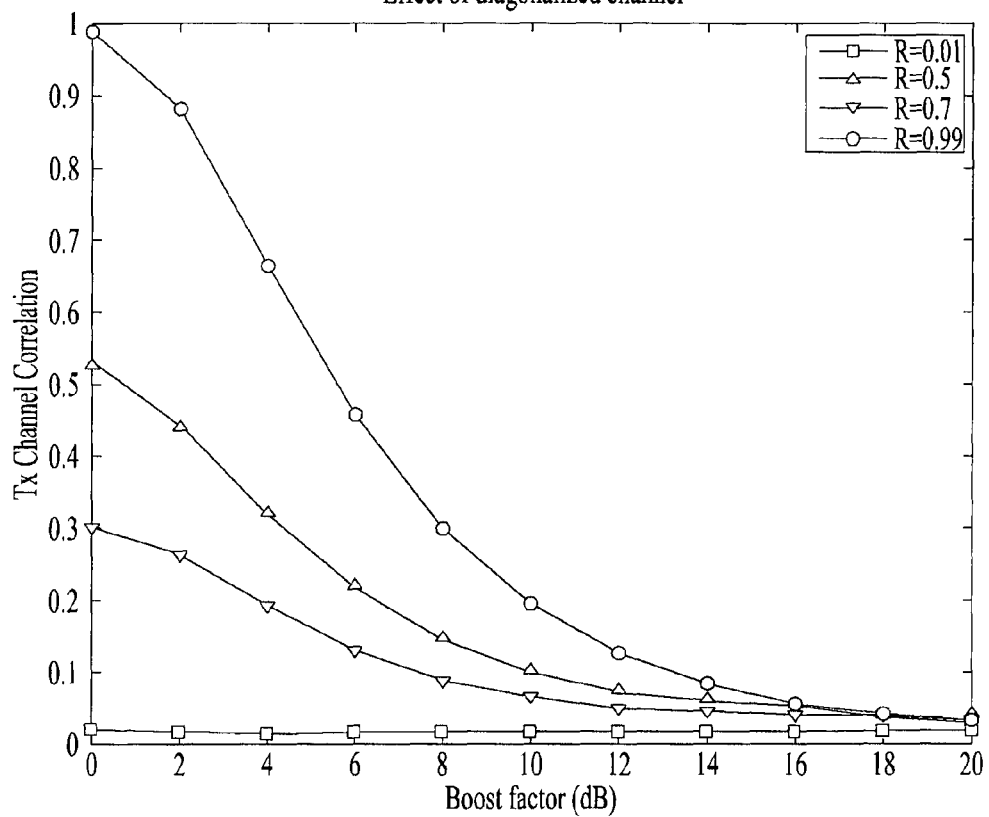
FIG. 12 shows a result of simulation.

A channel (H1) between the first wireless device and the RF repeater is gradually diagonalized and correlation between Tx antennas of an effective channel (H2FH1) is observed. FIG. 12 shows the result of the above observation. In this case, a boost factor (BF) indicates how much a diagonal element of the channel (H1) is larger than an off-diagonal element on average. For example, if BF is set to 3 dB (BF=3 dB), this means that the magnitude of a diagonal element is larger than that of the off-diagonal element two times on average. That is, the diagonalized degree of the channel (H1) gradually increases in proportion to the increasing BF. As can be seen from the simulation result of FIG. 12, as the channel (H1) between the first wireless device and the RF repeater is gradually diagonalized, it can be recognized that correlation between Tx antennas of the effective channel is gradually reduced. In this case, diagonalizing the channel (H1) between the first wireless device and the RF repeater means that Tx antennas of the first wireless device are mapped to Rx antennas of the RF repeater on a one to one basis. In FIG. 12, term "R" is referred to a correlation of Tx antennas of the first wireless device. If the channel (H1) is not boosted by BF, that is, if a distance between the first wireless device and the RF repeater is far enough, R is equal to a transmission correlation of the channel (H1). Upon referring to FIG. 12, the Tx channel correlation of the channel (H2FH1) is equal to a value of R when BF is zero (0). If the channel (H1) is boosted by BF, the higher BF is applied, the lower the Tx channel correlation of the channel (H2FH1) is obtained.

When the first wireless device such as a mobile phone is used in small-area wireless communication environments, such as inside of cars, the correlation of Tx antennas of the first wireless device is relative higher than that used in large-area wireless communication environments. In this regard, it is needed to reduce the correlation of Tx antennas of the first wireless device in order to enhance data throughput, that is, to boost is needed. In other words, in accordance with embodiments of the present application, if the RF repeater is used in small-area wireless communication environments, such as inside of cars, the channel (H1) can be boosted as illustrated in FIG. 12.

In addition, the experimental result of the SNR-based channel capacity in response to BF of the channel (H1) is as follows. Referring to Equation 12, if the channel (H1) has high SNR, i.e., if noise and interference (i.e., z1) between the first wireless device and the RF repeater can be negligible, the Equation 12 can be represented by the following equation 13.

$$y=H_2FH_1x+z_2 \qquad \text{[Equation 13]}$$

Figure 13:
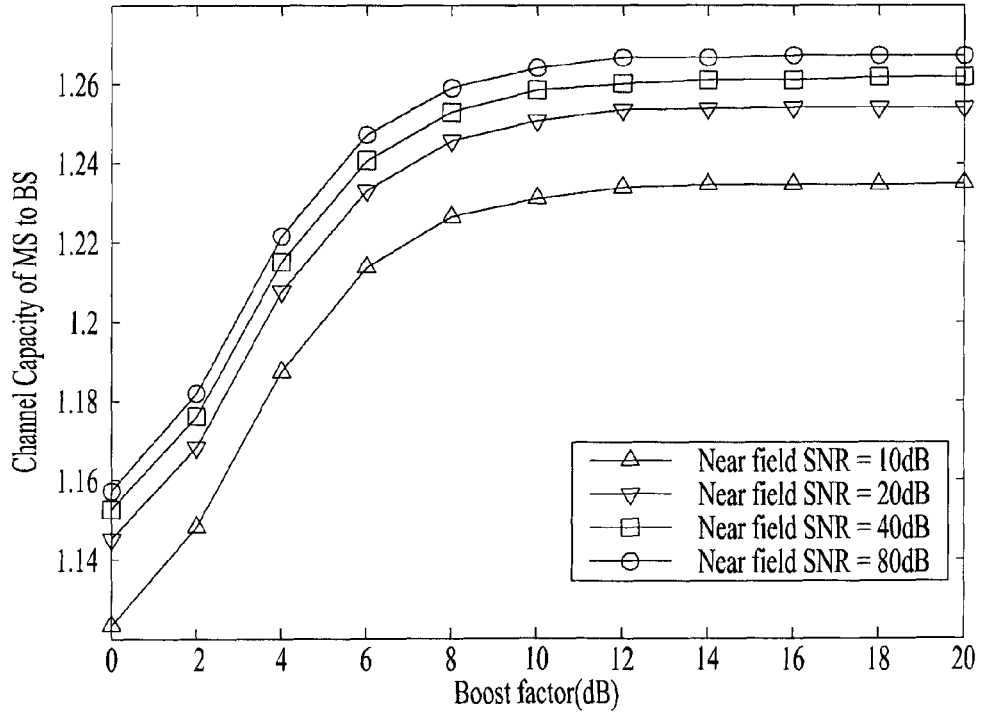
FIG. 13 shows the reception signal (y) obtained by reflecting the diagonalized effect of the channel (H1).

In Equation 13, the reception signal (y) of the second wireless device is obtained by reflecting the diagonolized effect of the above channel (H1) acting as a contiguous channel, as shown in FIG. 13.

[1.3: Modeling Method of Contiguous Channel (H1)]

A relatively pathloss in response to a distance (d) between each Tx antenna of the first wireless device (UE) and each Rx antenna of the RF repeater is modeled. If the antenna position of the first wireless device is identical to the antenna position of the RF repeater, d=0 is assumed. It is assumed that a relative pathloss at d=0 is set to 0 dB. It is assumed that a relative pathloss may be denoted by the following equation 14.

$$\text{pathloss(dB)}=17(\exp(-0.2d)-1) \qquad \text{[Equation 14]}$$

In addition, a MIMO channel having a general LoS (Line of Sight) environment is generated, and a relative pathloss value in response to the distance (d) between each Tx antenna of the first wireless device and each Rx antenna of the RF repeater is reflected so that the resultant MIMO channel can be generated.

In addition, it is assumed that each of power amplification of the RF repeater and the improved signal amplification gain caused by Rx-Tx antennas of the RF repeater compared to the first wireless device is denoted by 15 dB, an average pathloss between the first wireless device and the RF repeater is denoted by 15 dB, and an SNR between the RF repeater and the second wireless device is denoted by 2 dB. In addition, a reference SNR between the first wireless device and the RF repeater is variably set to an SNR on the assumption that there is no pathloss between the two devices. In addition, each of Tx/Rx antennas between the first wireless device and the second wireless device is set to 2. It is assumed that the number of external antennas (i.e., antennas for Tx/Rx used to communicate with the second wireless device) of the RF repeater is set 2.

[1.4: Simulation 2]

FIG. 14 shows an exemplary model of the RF repeater and the first wireless device (UE) for experimenting the effect of embodiments of the present invention. FIGS. 14(*a*), 14(*b*) and 14(*c*) show the antenna positions of the RF repeater, and FIGS. 14(*d*), 14(*e*) and 14(*f*) show the antenna positions of the first wireless device. Assuming that respective antenna positions are denoted by orthogonal coordinates, the results are (a) (0, 0) (b) (−5, 0), (5, 0) (c) (0, 0), (−5, 0), (5, 0), (0, −5), (0, 5), (−5, 5), (5, 5), (5, −5), (−5, −5), (d) (−4, 4), (4, −4), (e) (0, 4), (0, −4), (f) (4, 0), and (−4, 0). In addition, this simulation assumes that the RF repeater has the same size as that of the first wireless device for convenience of description and better understanding of the present invention.

Figure 15:
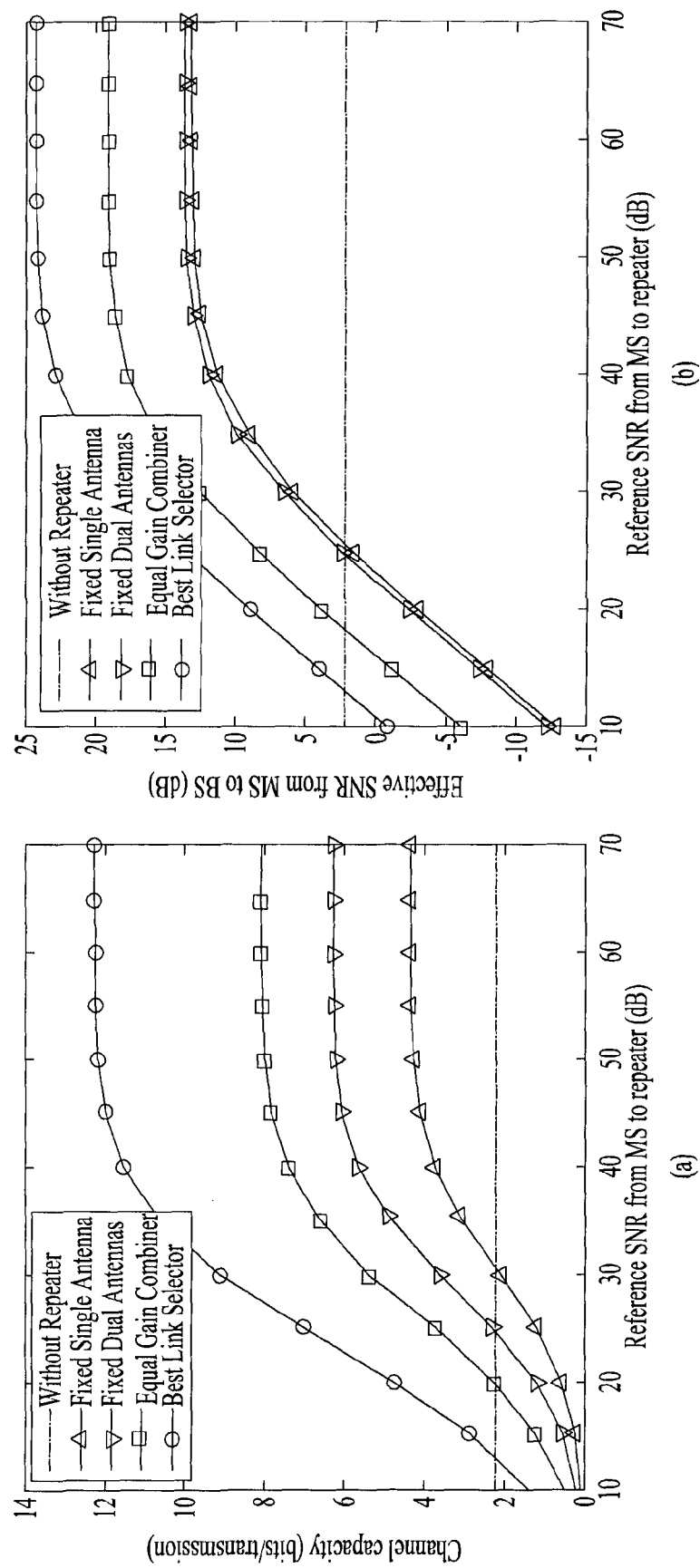
FIG. 15 shows the simulation result of the (a)-(d) combination of FIG. 14.
Figure 16:
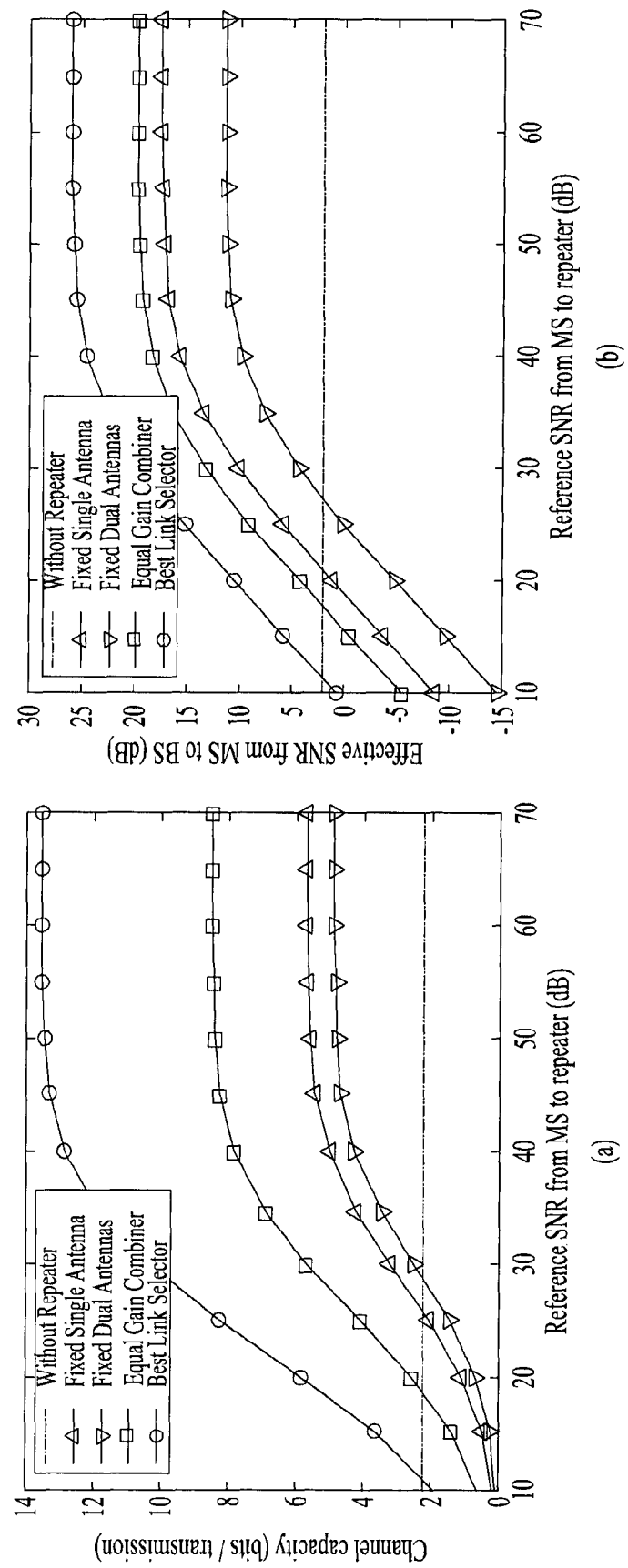
FIG. 16 shows the simulation result of the (b)-(e) combination of FIG. 14.
Figure 17:
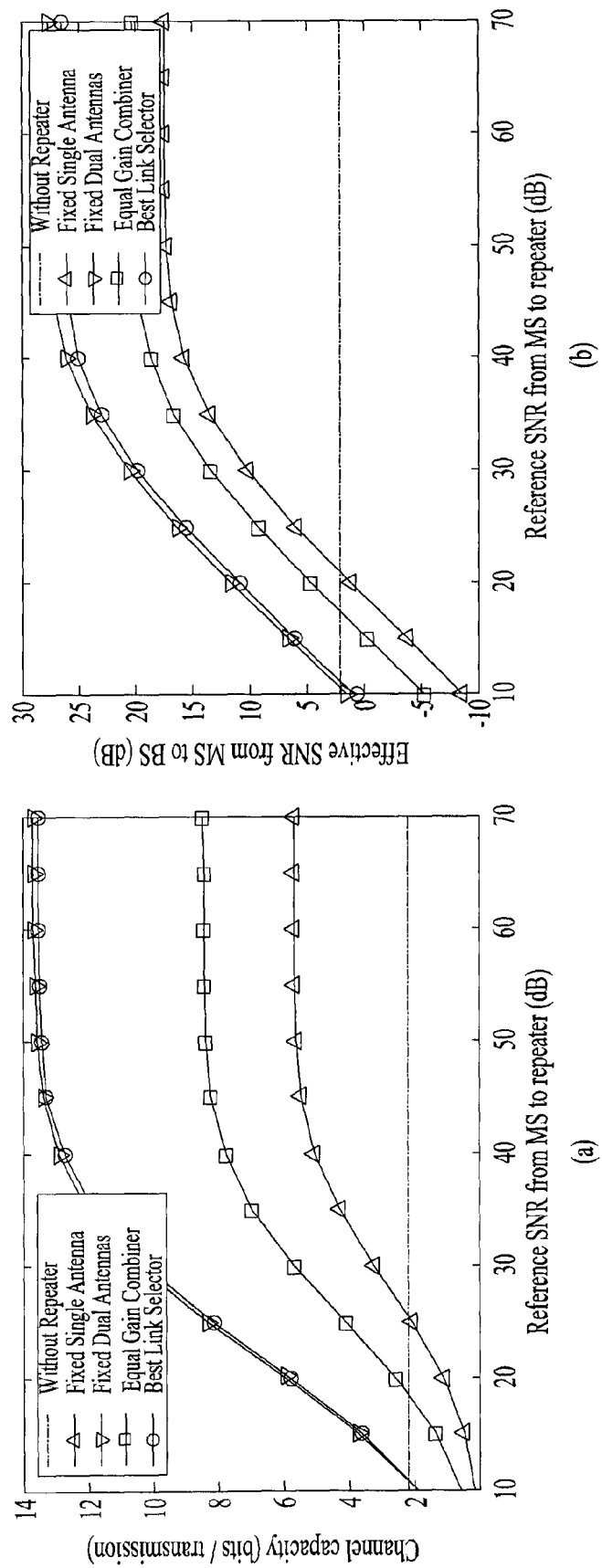
FIG. 17 shows the simulation result of the (c)-(f) combination of FIG. 14.

Combination of the RF repeater and the first wireless device shown in FIG. 14, (a)-(d), (b)-(e), and (c)-(f) simulation results are respectively shown in FIGS. 15, 16 and 17, respectively.

The simulation result of the (a)-(d) combination of FIG. 14 will hereinafter be described with reference to FIG. 15. It can be recognized that a dual link has superior channel capacity as compared to a single link. Here, the single link is a link between one Tx antenna of the first wireless device and one Rx antenna of the RF repeater—as denoted by "Fixed Single Antenna" of FIG. 15(*a*), and the dual link is a link between one Rx antenna of the RF repeater and two Tx antennas of the first wireless device—as denoted by "Fixed Dual Antenna" of FIG. 15(*a*). In addition, it can be recognized that the best link denoted by "Best Link Selector" of FIG. 15(*a*) from among the dual link has superior channel capacity as compared to an equal gain combiner of FIG. 15(*a*) in which each link is link-combined with the same gain. That is, selecting the best link may be utilized for selecting a specific link to be used for link distribution, such that superior effect can be acquired.

The simulation result of SNR shown in FIG. 15(*b*) is similar to FIG. 15(*a*), and the improvement degree (effect) of FIG. 15(*b*) is smaller than that of channel capacity.

FIG. 16 shows the simulation result of the (b)-(e) combination of FIG. 14. Differently from the result of FIG. 15, a single link is more superior to the dual link in terms of channel capacity and SNR due to a difference in antenna arrangement of the RF repeater. The remaining results of FIG. 16 are similar to those of FIG. 15.

FIG. 17 shows the simulation result of the combination (c)-(f) shown in FIG. 14. In FIG. 17, performance of a dual link (denoted by a line of "Fixed Dual Antenna" of FIGS. 17(*a*) and 17(*b*)) is almost similar to selection of the best-performance link (denoted by a line of "Best Link Selector" of FIGS. 17(*a*) and 17(*b*)). The two cases indicate that Rx antennas of the same RF repeater are selected.

[1.5: Simulation 3]

The simulation in which Ntx,REP=2 is changed to Ntx,REP=4 will hereinafter be described with reference to FIGS. 18 to 20. Four schemes for Simulation 3 will hereinafter be described with reference to FIG. 18.

Figure 18:
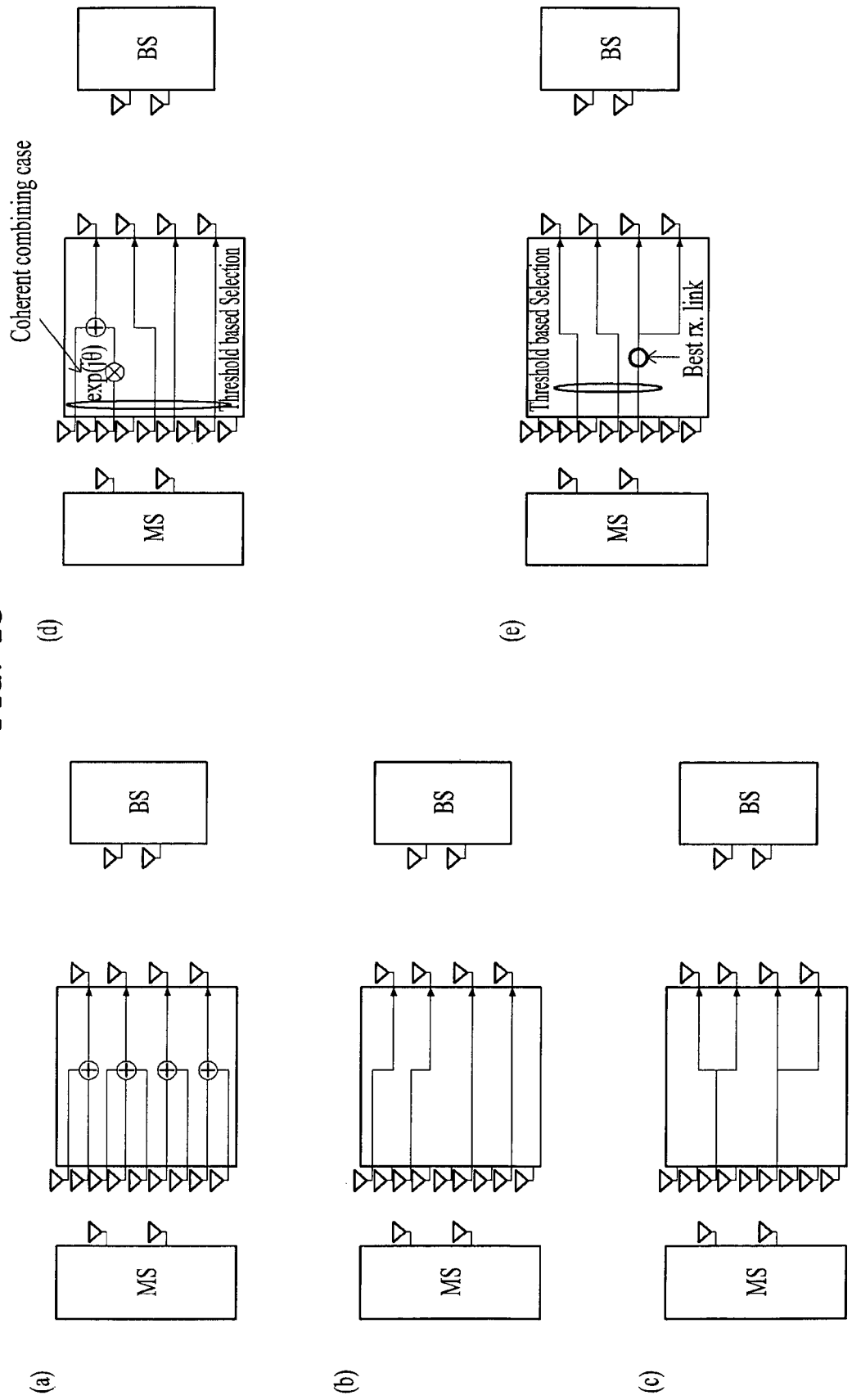
FIG. 18 shows four schemes for Simulation 3.

FIG. 18(*a*) shows the same gain combining scheme in which the same gain is added to Rx signals of all Rx antennas of the RF repeater, and Ntx,REP signals(links) (where Ntx,REP=4) are selected and mapped to Tx antennas of the RF repeater. In FIGS. 19 and 20 to be described later, "Equal Gain Combiner" is shown. In accordance with the scheme of FIG. 18(*b*), Ntx,REP signals(links) having the best Rx quality (where Ntx,REP=4) from among Rx signals received through all Rx antennas of the RF repeater are selected and mapped to Tx antennas of the RF repeater, and are mapped to Tx antennas of the RF repeater. In FIGS. 19 and 20, "Best Ntx,REP Link Selector" is shown. In accordance with the scheme of FIG. 18(*c*), Ntx signals(links) having the best Rx quality (where Ntx=2 of FIG. 18(*c*)) from among Rx signals received through all Rx antennas of the RF repeater are selected and mapped to Tx antennas of the RF repeater, and are mapped to Tx antennas of the RF repeater. In accordance with the scheme of FIGS. 18(*d*) and 18(*e*), M signals (links) having Rx quality of a threshold or greater are selected from among Rx signals received through all Rx antennas of the RF repeater, and are then mapped to Tx antennas of the RF repeater. In this case, if M>Ntx,REP, some parts of the selected signals (links) are combined (See FIG. 18(d)). If M<Ntx,REP, some parts of the selected signals (links) are distributed (See FIG. 18(e)).

On the other hand, if some parts of the selected signals (links) are combined, signals (links) having low Rx quality (for example, low Rx signal intensity) are sequentially combined, the scheme without compensating phase differences between at least two signals of the selected signals is referred to as the non-coherent combining scheme (denoted by "Threshold Based Link Selector" in FIGS. 19 and 20), and the scheme for compensating for a phase difference of each Rx antenna of the RF repeater of a Tx signal (link) transmitted from the same Tx antenna of the first wireless device is referred to as a coherent combining scheme (denoted by "Threshold based Coherent Link Selector in FIGS. 19 and 20). In addition, the scheme for distributing some parts of the selected signals (links) sequentially distributes high-Rx-quality signals (links) in descending numerical order of Rx signal quality (e.g., Rx signal intensity), such that many more superior-quality links can be selected and transmitted on uplink.

FIG. 19 shows channel capacity based on the number of selected links (signals) in case of the link selection shown in FIG. 18. The scheme of FIG. 18(d) and the scheme of FIG. 18(e) can obtain much more channel capacity than the scheme of FIG. 18(a) when M is set to 2 or greater (M≥2). In addition, the scheme of FIG. 18(e) can obtain much more channel capacity than the scheme of FIG. 18(d) when M is set to 5 or greater (M≥5), and can obtain a higher-performance effect in proportion to the increasing M within the corresponding range.

Referring to FIG. 19, it can be recognized that the case of M=Ntx has the highest channel capacity. That is, although selecting the Rx signal (link) corresponding to the number (Ntx) of Tx antennas of the first wireless device by the RF repeater may obtain the largest channel capacity, this means that the RF repeater has to recognize the number (Ntx) of Tx antennas of the first wireless device so as to acquire the above effect. Therefore, assuming that the RF repeater does not recognize the number (Ntx) of Tx antennas of the first wireless device, a specific number of Rx signals (links) may be selected using the scheme of FIG. 18(b), 18(e), or 18(d), or the selected Rx signals (links) may be combined to increase the channel capacity.

FIGS. 19(a), 19(b), and 19(c) respectively show the simulation results of the (a)-(d) combination, the (b)-(e) combination, and the (c)-(f) combination.

FIG. 20 shows the channel capacity in response to the increasing number (Ntx,REP) of Tx antennas of the RF repeater. Referring to FIG. 20, if SNR of a channel between the first wireless device and the RF repeater is located in a low-medium band (for example, about a bandwidth of 10 to 35 dB), a gain caused by the increasing channel capacity in response to the increasing number of Tx antennas of the RF repeater is not high in level. On the other hand, if the channel SNR is placed in a specific bandwidth (for example, a bandwidth of about 35 to 70 dB), there occurs a high gain caused by channel capacity in response to the increasing number of Tx antennas of the RF repeater. That is, according to the above-mentioned result, it can be understood that the gain caused by the increasing channel capacity is based on the increasing total Tx power.

FIGS. 20(a), 20(b), and 20(c) respectively show the simulation results of the (a)-(d) combination, the (b)-(e) combination, and the (c)-(f) combination.

Figure 21:
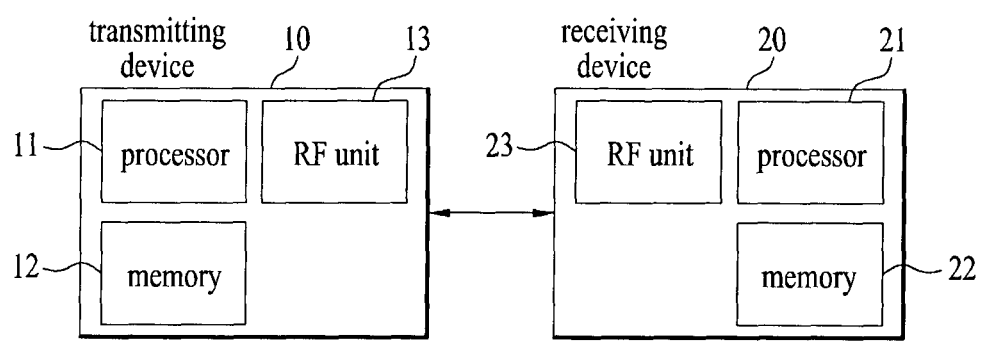
FIG. 21 is a block diagram of a transmitting device and a receiving device configured to implement exemplary embodiments of the present invention.

FIG. 21 is a block diagram of a transmitting device 10 and a receiving device 20 configured to implement exemplary embodiments of the present invention. Referring to FIG. 21, a transmitting device 10 and a receiving device 20 respectively include Radio Frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and controlling the processors 11 and 21 and may temporarily storing input/output information. The memories 12 and 22 may be used as buffers.

The processors 11 and 21 control the overall operation of various modules in the transmitting device 10 or the receiving device 20. The processors 11 and 21 may perform various control functions to perform the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the exterior. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a Medium Access Control (MAC) layer. One Transport Block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr (where Nr is a positive integer) receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wish to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A Reference Signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on an uplink and as the receiving device 20 on a downlink. In embodiments of the present invention, an eNB or BS serves as the receiving device 20 on an uplink and as the transmission device 10 on a downlink. In addition, in embodiments of the present invention, the RF amplifier may operate as the transmission device 10 on uplink and as the receiving device 20 on a downlink. In addition, although not shown in the drawings, the RF repeater includes Tx/Rx antenna(s) and the signal repeater as shown in FIG. 6, the RF unit 13 or 23 may include the Tx/Rx antennas as shown in FIG. 18, and the processor 11 or 21 may include the signal repeater.

Detailed UE or BS structures serving as the transmitter or the receiver may be implemented in a manner that various embodiments of the present invention are performed independently or two or more embodiments of the present invention are performed simultaneously.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

MODE FOR INVENTION

Various embodiments have been described in the best mode for carrying out the invention.

INDUSTRIAL APPLICABILITY

The method and apparatus for transmitting and receiving downlink signals according to embodiments of the present invention can be applied to a UE, a BS (eNB), a radio frequency (RF) repeater, or other communication devices in a wireless communication system.

The invention claimed is:

1. A transmission apparatus for receiving a plurality of uplink (UL) signals from a user equipment (UE) and transmitting the plurality of received UL signals to a base station (BS) in a wireless communication system, the transmission apparatus comprising:
   a plurality of reception antennas (Nrx,REP Rx antennas) configured to receive a plurality of UL signals from the UE;
   a radio frequency (RF) repeater configured to amplify and map the plurality of received UL signals to at least one transmission antenna; and
   a plurality of transmission antennas (Ntx,REP Tx antennas) configured to transmit the plurality of amplified UL signals to the BS,
   wherein the RF repeater is further configured to select M received UL signals from among Nrx,REP received UL signals which are received by the Nrx,REP Rx antennas, and map the M received UL signals to N Tx antennas from among the Ntx,REP Tx antennas,
   wherein if M is higher than N, the RF repeater is configured to perform grouping of the M received UL signals to N signal groups, where one of the N signal groups is respectively mapped to one of the N Tx antennas,
   wherein the N signal groups comprise a first signal group which includes relatively good-quality UL signals among the M received UL signals and a second signal group which includes relatively poor-quality UL signals among the M received UL signals, and
   wherein a number of UL signals belonging to the first signal group is less than a number of UL signals belonging to the second signal group.

2. The transmission apparatus according to claim 1, wherein:
   if M is less than N, the RF repeater is configured to distribute the M received UL signals, wherein a best-quality UL signal from among the M received UL signals is primarily distributed.

3. The transmission apparatus according to claim 1, wherein M is determined to be a number of received UL signals of which quality is equal to or higher than a specific threshold from among the M received UL signals.

4. The transmission apparatus according to claim 1, wherein N is determined to be a number of received UL signals of which quality is equal to or higher than a specific threshold from among the M received UL signals.

5. The transmission apparatus according to claim 1, wherein the RF repeater is further configured to adjust a phase of the first signal group or the second signal group so as to compensate for a phase difference between the first signal group and the second signal group.

6. The transmission apparatus according to claim 1, wherein N is less than Ntx,REP.

7. A method for transmitting a plurality of uplink (UL) signals using a transmission apparatus including a radio frequency (RF) repeater and configured to receive the plurality of UL signals from a user equipment (UE) and transmit the plurality of received UL signals to a base station (BS) in a wireless communication system, the method comprising:

receiving a plurality of UL signals from the UE through a plurality of reception antennas (Nrx,REP Rx antennas); and amplifying and mapping the plurality of received UL signals to at least one transmission antenna, wherein the mapping comprises:

selecting M received UL signals from among Nrx,REP UL signals which are received by the Nrx,REP Rx antennas, and mapping the M received UL signals to N Tx antennas from among a plurality of transmission antennas (Ntx,REP Tx antennas), wherein if M is higher than N, the RF repeater is configured to perform grouping of the M received UL signals to N signal groups, where one of the N signal groups is respectively mapped to one of the N Tx antennas, wherein the N signal groups comprise a first signal group which includes relatively good-quality UL signals among the M received UL signals and a second signal group which includes relatively poor-quality UL signals among the M received UL signals, and wherein the number of UL signals belonging to the first signal group is less than the number of UL signals belonging to the second signal group.

8. The method according to claim 7, wherein:

if M is less than N, the RF repeater is configured to distribute the M received UL signals, wherein a best-quality UL signal from among the M received UL signals is primarily distributed.

9. The method according to claim 7, wherein M is determined to be a number of received UL signals of which quality is equal to or higher than a specific threshold from among the M received UL signals.

10. The method according to claim 7, wherein N is determined to be a number of received UL signals of which quality is equal to or higher than a specific threshold from among the M received UL signals.

11. The method according to claim 7, further comprising:

adjusting a phase of the first signal group or the second signal group so as to compensate for a phase difference between the first signal group and the second signal group.

12. The method according to claim 7, wherein N is less than Ntx,REP.

* * * * *